(12) United States Patent
Nakao et al.

(10) Patent No.: US 6,965,550 B2
(45) Date of Patent: Nov. 15, 2005

(54) OPTICAL DISK IDENTIFYING DEVICE, OPTICAL DISK IDENTIFYING METHOD, OPTICAL DISK RECORDER, AND OPTICAL DISK REPRODUCING DEVICE

(75) Inventors: Shinichi Nakao, Kanagawa (JP); Yoshiro Arikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 10/478,212

(22) PCT Filed: Mar. 28, 2003

(86) PCT No.: PCT/JP03/04033

§ 371 (c)(1),
(2), (4) Date: Nov. 28, 2003

(87) PCT Pub. No.: WO03/088228

PCT Pub. Date: Oct. 23, 2003

(65) Prior Publication Data

US 2004/0165501 A1    Aug. 26, 2004

(30) Foreign Application Priority Data

Mar. 29, 2002  (JP)  .............................. 2002-098050

(51) Int. Cl.[7] .............................................. G11B 7/00
(52) U.S. Cl. .................................. 369/53.23; 369/53.31
(58) Field of Search .......................... 369/44.13, 44.26, 369/47.1, 53.2, 47.27, 52.23, 52.22, 53.31

(56) References Cited

U.S. PATENT DOCUMENTS 6,201,784 B1 *   3/2001   Maeda ..................... 369/59.25

FOREIGN PATENT DOCUMENTS

| JP | 8-235763 | 9/1996 |
|---|---|---|
| JP | 9-198779 | 7/1997 |
| JP | 11-176070 | 7/1999 |
| JP | 2000-322742 | 11/2000 |
| JP | 2001-210004 | 8/2001 |
| JP | 2002-230753 | 8/2002 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

A tracking error signal calculating unit (221) detects a tracking error signal of light with respect to a mark recorded on a wobbled groove in a focused-on state from the light reflected back from the wobbled groove. A pull-in signal calculating unit (225) detects a total light volume signal PI of the mark, recorded on the wobbled groove, from the reflected light. A D-flipflop discriminating circuit (244) compares the phase of a binary coded version of a tracking error signal TE detected by the tracking error signal calculating unit to the phase of a binary coded version of the total light volume signal PI as detected by the pull-in signal calculating unit to discriminate the sorts of the optical discs having the same outer shape and the same optical system but differing in the UTOC recording system.

13 Claims, 25 Drawing Sheets

|  | MINI-DISC (MD DATA) | NEXT GENERATION MD1 | NEXT GENERATION MD2 |
|---|---|---|---|
| TRACK PITCH | 1.6 μm | 1.3 μm | 1.25 μm |
| BIT LENGTH | 0.59 μm/bit | 0.44 μm/bit | 0.16 μm/bit |
| λ·NA | 780nm・0.45 | 780nm・0.45 | 780nm・0.45 |
| RECORDING SYSTEM | Groove RECORDING | Groove RECORDING | Groove RECORDING+DWDD |
| ADDRESSING SYSTEM | SINGLE SPIRAL BOTH-SIDE WOBBLE | SINGLE SPIRAL BOTH-SIDE WOBBLE | SINGLE SPIRAL BOTH-SIDE WOBBLE |
| MODULATION SYSTEM | EFM | 1-7PP | 1-7PP |
| ERROR CORRECTION SYSTEM | ACIRC | RS-LDC | LDC+BIS |
| INTERLEAVING | CONVOLUTION | BLOCK COMPLETION | BLOCK COMPLETION |
| REDUNDANCY | 46.3% | 20.50% | 20.50% |
| DETECTION SYSTEM | bit by bit | PR(1,2,1)ML | PR(1,-1)ML |
| LINEAR VELOCITY | 1.2m/s | 2.4m/s | 2.0m/s |
| DATA RATE | 133KB/s | 4.4Mbit/s | 9.8Mbit/s |
| TOTAL CAPACITY | 164MB(140MB) | 300MB | 1GB |
| CLUSTER STRUCTURE (MINIMUM REWRITE UNIT) | 32sectors +4 link sectors | 16sectors | 16sectors |

FIG.2

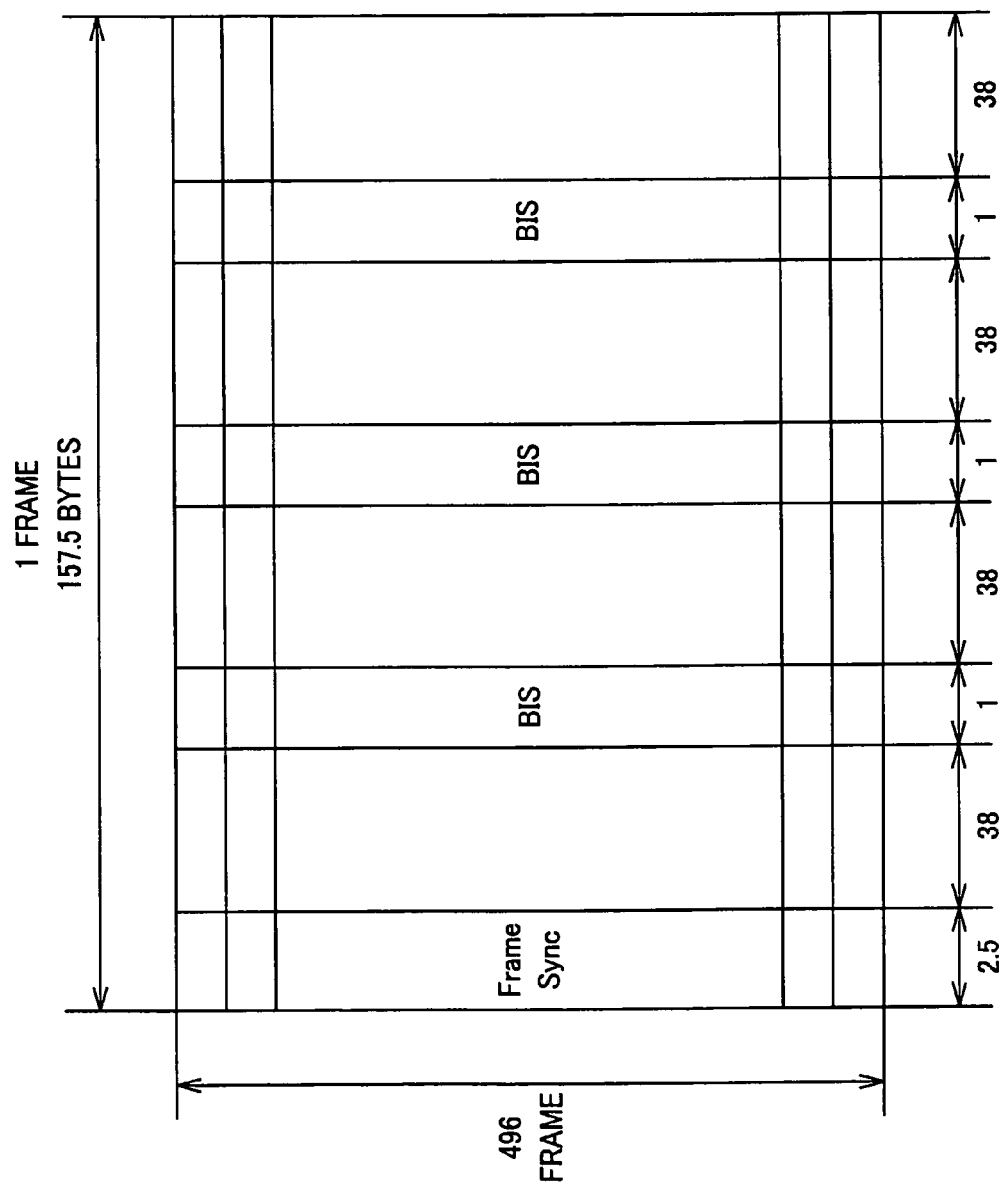

FIG.22A

| SYNC 4bit | CLUSTER H 4bit | CLUSTER M 8bit | CLUSTER L 4bit | SECTOR 4bit | BCH CODE PARITY 18bit |
|---|---|---|---|---|---|
| 0   3 | 4   7 | 8     15 | 16   19 | 20   23 | 24                              41 |

FIG.22B

| SYNC 4bit | CLUSTER H 8bit | CLUSTER L 8bit | SECTOR 8bit | BCH CODE PARITY 14bit |
|---|---|---|---|---|
| 0   3 | 4         11 | 12         19 | 20         27 | 28                        41 |

| SYNC 4bit | CLUSTER H 8bit | CLUSTER L 8bit | SECTOR 4bit | BCH CODE PARITY 18bit |

FIG.23

OPTICAL DISK IDENTIFYING DEVICE, OPTICAL DISK IDENTIFYING METHOD, OPTICAL DISK RECORDER, AND OPTICAL DISK REPRODUCING DEVICE

TECHNICAL FIELD

This invention relates to an optical disc discriminating apparatus and an optical disc discriminating method for discriminating plural different sorts of the optical discs which are the same in recording system, addressing system and outer shape but different in recording capacity. This invention also relates to an optical disc recording apparatus and an optical disc reproducing apparatus for recording the information and for reproducing the information, respectively, after discriminating the sort of an optical disc loaded in position thereon by the above-mentioned optical disc discriminating apparatus and method.

This application claims priority of Japanese Patent Application No. 2002-098050, filed in Japan on Mar. 29, 2002, the entirety of which is incorporated by reference herein.

BACKGROUND ART

An optical disc, approximately 64 mm in diameter, having a recording capacity capable of recording music sound signals for 74 minutes or longer, is currently well known. This small-sized optical disc, termed a Mini-Disc (registered trademark), is classified into a replay-only disc, having data recorded as pits, and a recording and/or reproducing disc, having data recorded by a magneto-optical recording (MO) system and which may thus also be reproducible. The following description is directed to a small-sized recording and/or reproducing disc, referred to below as a magneto-optical disc. With this magneto-optical disc, the track pitch, the recording wavelength of the recording laser light or the NA of the objective lens have come to be ameliorated in order to increase disc's recording capacity.

A magneto-optical disc of an initial stage, in which groove recording is carried out with the track pitch of 1.6 $\mu$m, is termed the first generation MD. The physical format of this first generation MD is prescribed as follows: The track pitch is 1.6 $\mu$m and the bit length is 0.59 $\mu$m/bit. The laser wavelength $\lambda$ is set to $\lambda$= 780 nm and the numerical aperture of the optical head NA is set to NA=0.45. The recording system employed is the groove recording system in which a groove (i.e. a groove formed on the disc surface) is used as a track for recording and/or reproduction. The address system employed is a system employing the wobbled groove in which a single-spiral groove is formed on a disc surface and in which a wobble as the address information is formed on both sides of this groove. Meanwhile, in the present specification, the absolute address recorded by the wobbling is termed an ADIP (Address in Pre-Groove).

In the conventional first generation MD, an EFM (8 to 14 modulation) system is employed as the recording data modulating system. As the error correction system, ACIRC (Advanced Cross Interleave Reed-Solomon Code) is used. For data interleaving, a convolution type data interleaving is used. In this manner, data redundancy amounts to 46.3%.

In the first generation MD, the data detection system is a bit-by-bit system, while the disc driving system used is the CLV (Constant Linear Velocity) system. The linear velocity of the CLV system is 1.2 m/sec.

The standard data rate during recording and/or reproduction is 133 kB/sec, while the recording capacity is 164 MB (140 MB for MD-DATA). The minimum data re-write unit (cluster) is constructed by 36 sectors composed of 32 main sectors and four link sectors.

Moreover, in these days, the next-generation MD, having a recording capacity further improved over the first generation MD, is being developed. Such an MD in which the medium is unchanged from the conventional medium (disc orb cartridge), and in which the modulation system or the logical structure is changed to increase the data recording capacity to for example 300 MB is now contemplated. This MD is referred to below as the next-generation MDI. The physical parameters of the recording medium are the same, the track pitch is 1.6 $\mu$m, the laser light wavelength $\lambda$ is such that $\lambda$=780 nm and the numerical aperture of the optical head NA is such that NA=0.45. The recording system used is the groove recording system. The address system used is the ADIP. Thus, the structure of the optical system, ADIP address readout system and the servo processing in the disc driving device are similar to those of the conventional mini-disc. In this manner, compatibility with the conventional disc (first generation MD) is maintained. That is, the mode of the next generation MD may co-exist with the conventional mode.

If a reproducing apparatus for coping only with the first generation MD is unable to co-exist with the new mode, that is, unable to reproduce the next generation MD1, an alerting area having recorded the information alerting that the UTOC or replay of the first generation MD is not possible may be recorded with the conventional recording format, in which case it may be seen that reproduction is not possible with the reproducing apparatus adapted for coping only with the first generation MD because the UTOC or the alerting area may be read even with such reproducing apparatus adapted for coping only with the first generation MD.

Meanwhile, it may be premeditated that an MD further increased in recording capacity as compared to the aforementioned next generation MD1, referred to below as a next generation MD2, may be offered to the market as a new recording medium in which the UTOC recording system is changed or the aforementioned alerting area is not provided and in which compatibility as to the outer shape or the optical system is maintained.

If, in such case, the next generation MD2 is loaded on a recording and/or reproducing apparatus capable of recording and/or reproducing the next generation MD1, the UTOC of the next generation MD2 cannot be accessed. Moreover, since there is provided no alerting area, it is impossible to alert to the user that the MD loaded is of such a sort that recording and/or reproduction is not possible with the recording and/or reproducing apparatus.

DISCLOSURE OF THE INVENTION

It is an object of the present invention to provide an optical disc discriminating apparatus and an optical disc discriminating method whereby it is possible to discriminate the optical disc which has the outer shape and the optical system in common with the next generation MD1 but which is different in the UTOC recording system, such as the aforementioned next generation MD2. It is another object of the present invention to provide an optical disc recording apparatus and an optical disc reproducing apparatus for recording and reproducing the information, respectively, after discriminating the sort of the loaded optical disc by the above optical disc discriminating apparatus and method.

To this end, the present invention provides an optical disc discriminating apparatus for discriminating plural sorts of optical discs in which data are recorded in a groove presenting a wobble or a land of an optical disc, the groove presenting the wobble indicating addresses, and in which the optical discs are of the same outer shape but differ in the recording capacity, wherein the apparatus comprises rotational driving means for rotationally driving the optical disc, optical means for converging the light for reading out data recorded in the wobble of the optical disc on the optical disc by a converging lens, tracking error detecting means for detecting a tracking error signal for the groove, presenting the wobble, from the light focused on the optical disc by the optical means and reflected back from the groove presenting the wobble, total light volume signal detection means for detecting a total light volume signal of a mark recorded on the groove, presenting the wobble, from the reflected light from the groove, presenting the wobble, on which the light has been focused by the optical means, and discriminating means for discriminating the sorts of the optical discs based on phase comparison between a binary-coded version of the tracking error signal detected by the tracking error detection means and a binary-coded version of the total light volume signal as detected by the total light volume signal detection means.

The present invention also provides an optical disc discriminating method for discriminating plural sorts of optical discs in which data are recorded in a groove presenting a wobble or a land of an optical disc, the groove presenting the wobble indicating addresses, and in which the optical discs are of the same outer shape but differ in the recording capacity, wherein the optical disc discriminating method comprises a tracking error detecting step of focusing the light radiated to the optical disc rotationally driven by the rotational driving means, through a converging lens, on the data recorded on the groove of the optical disc, presenting the wobble, and detecting the tracking error signal of the light with respect to a mark recorded on the groove, presenting the wobble, on which the light has been focused, a total light volume detecting step of detecting a total light volume detecting signal of the mark recorded on the groove, presenting the wobble, from the reflected light from the groove, presenting the wobble, on which the light has been focused, and a discriminating step of discriminating the sorts of the optical discs based on phase comparison between a binary coded version of the tracking error signal detected by the tracking error detection step and a binary coded version of the total light volume signal as detected by the total light volume signal detection step.

The present invention also provides an optical disc discriminating apparatus for discriminating plural sorts of optical discs in which data are recorded in a groove presenting a wobble or a land of an optical disc, the groove presenting the wobble indicating addresses, and in which the optical discs are of the same outer shape but differ in the recording capacity, wherein the apparatus comprises rotational driving means for rotationally driving the optical disc, optical means for converging radiated light by a focusing lens on the optical disc, rotationally driven by the rotational driving means, for focusing the so converged light on the optical disc, total light volume signal detection means for detecting a total light volume signal of a mark recorded on the groove, presenting the wobble, from the reflected light from the groove, presenting the wobble, on which the light has been focused by the optical means, comparator means for outputting the results of comparison which is based on an inherent slice level with respect to the total light volume signal as detected by the total light volume signal detection means, and discrimination means for discriminating the sorts of the optical discs in dependence on the results of comparison by the comparator means.

The present invention also provides an optical disc discriminating method for discriminating plural sorts of optical discs in which data are recorded in a groove presenting a wobble or a land of an optical disc, the groove presenting the wobble indicating addresses, and in which the optical discs are of the same outer shape but differ in the recording capacity, wherein the optical disc discriminating method comprises a total light volume detecting step of focusing the light radiated to the optical disc rotationally driven by the rotational driving means, through a converging lens, on the data recorded on the groove of the optical disc, presenting the wobble, and detecting a total light volume signal of a mark recorded on the groove, presenting the wobble, on which the light has been focused, a comparing step of outputting the result of comparison which is based on a inherent slice level with respect to the total light volume signal as detected by the total light volume detecting step, and a discriminating step of discriminating the sorts of the optical disc in dependence on the results of comparison by the comparing step.

The present invention also provides an optical disc discriminating apparatus for discriminating plural sorts of optical discs in which data are recorded in a groove presenting a wobble, the groove presenting the wobble indicating addresses, and in which the optical discs are of the same outer shape but differ in the recording capacity, wherein the apparatus comprises rotational driving means for rotationally driving the optical disc, optical block movement means for causing movement of an optical block having a converging lens to a predetermined area on the optical disc after focusing pull-in of light through the converging lens to the optical disc, rotationally driven by the rotational driving means, peak holding means for holding a peak level of a high frequency signal detected from the optical block moved by the optical block movement means to the predetermined area of the optical disc, bottom holding means for holding a bottom level of a high frequency signal detected from the optical block moved by the optical block movement means to the predetermined area of the optical disc, difference detection means for detecting the difference between the peak level as held by the peak holding means and the bottom level as held by the bottom holding means, and discriminating means for discriminating the sorts of the optical discs by comparing the magnitude of the difference as detected by the difference detection means to a threshold value.

The present invention also provides an optical disc discriminating method for discriminating plural sorts of optical discs in which data are recorded in a groove presenting a wobble, the groove presenting the wobble indicating addresses, and in which the optical discs are of the same outer shape but differ in the recording capacity, wherein the method comprises an optical block movement step of causing movement of an optical block having a converging lens to a predetermined area on the optical disc, rotationally driven by rotational driving means, after focusing pull-in of light through the converging lens to the optical disc, a peak holding step of holding a peak level of a high frequency signal detected from the optical block moved by the optical block movement step to the predetermined area of the optical disc, a bottom holding step of holding a bottom level of a high frequency signal detected from the optical block moved by the optical block movement means to the predetermined area of the optical disc, a difference detection step of detecting the difference between the peak level as held by the peak holding step and the bottom level as held by the bottom holding step, and a discriminating step of discriminating the sorts of the optical discs by comparing the magnitude of the difference as detected by the difference detection step to a threshold value.

The present invention also provides an optical disc discriminating apparatus for discriminating plural sorts of optical discs in which data are recorded in a groove presenting a wobble, the groove presenting the wobble indicating addresses, and in which the optical discs are of the same outer shape but differ in the recording capacity, wherein the sorts of the optical discs are discriminated by detecting the frequency of the groove presenting a wobble.

The present invention also provides an optical disc discriminating method for discriminating plural sorts of optical discs in which data are recorded in a groove presenting a wobble, the groove presenting the wobble indicating addresses, and in which the optical discs are of the same outer shape but differ in the recording capacity, wherein the method comprises a step of detecting the wobble frequency, detecting the frequency of the groove presenting the wobble, and a step of discriminating the sorts of the optical discs based on the frequency of the wobble as detected by the wobble frequency detecting step.

The present invention also provides an optical disc discriminating apparatus for discriminating plural sorts of optical discs in which data are recorded in a groove presenting a wobble, the groove presenting the wobble indicating addresses, and in which the optical discs are of the same outer shape but differ in the recording capacity, wherein the sorts of the optical discs are discriminated in dependence on whether or not the groove presenting the wobble has been legible.

The present invention also provides an optical disc discriminating method for discriminating plural sorts of optical discs in which data are recorded in a groove presenting a wobble, the groove presenting the wobble indicating addresses, and in which the optical discs are of the same outer shape but differ in the recording capacity, wherein the method comprises a step of reading in the groove presenting the wobble, and a step of discriminating the sorts of the optical disc in dependence on whether or not the groove presenting the wobble has been legible by the step of reading in the groove presenting the wobble.

The present invention also provides an optical disc recording apparatus for recording the information on optical discs of plural sorts in which data are recorded in a groove presenting a wobble or a land, the groove presenting the wobble indicating addresses, and in which the optical discs are of the same outer shape but differ in the recording capacity, wherein the apparatus comprises rotational driving means for rotationally driving the optical disc, optical means for converging the light for reading out data recorded in the wobble of the optical disc on the optical disc by a converging lens, tracking error detecting means for detecting a tracking error signal for the groove, presenting the wobble, from the light focused on the optical disc by the optical means and reflected back from the groove presenting the wobble, total light volume signal detection means for detecting a total light volume signal of a mark recorded on the groove, presenting the wobble, from the reflected light from the groove, presenting the wobble, on which the light has been focused by the optical means, and discriminating means for discriminating the sorts of the optical discs based on phase comparison between a binary coded version of the tracking error signal detected by the tracking error detection means and a binary coded version of the total light volume signal as detected by the total light volume signal detection means. Proper signal processing is selected based on the results of discrimination of the sorts of the optical discs by the discriminating means to record the information on the optical disc.

The present invention also provides an optical disc discriminating apparatus for discriminating plural sorts of optical discs in which data are recorded in a groove presenting a wobble or a land of an optical disc, the groove presenting the wobble indicating addresses, and in which the optical discs are of the same outer shape but differ in the recording capacity, wherein the apparatus comprises rotational driving means for rotationally driving the optical disc, optical means for converging and focusing the radiated light by a converging lens on the disc rotationally driven by the rotational driving means, total light volume signal detection means for detecting a total light volume signal of a mark recorded on the groove presenting the wobble, from the light focused by the optical means on the groove presenting the wobble and reflected back from the groove presenting the wobble, comparing means for outputting the results of comparison which is based on an inherent slice level with respect to the total light volume signal as detected by the total light volume signal detection means, and discriminating means for discriminating the sorts of the optical discs based on the results of comparison by the comparison means. Proper signal processing is selected based on the results of discrimination of the sorts of the optical disc by the discriminating means to record the information on the optical disc.

The present invention also provides an optical disc recording apparatus for recording the information on one of plural sorts of optical discs in which data are recorded in a groove presenting a wobble, or a land, the groove presenting the wobble indicating addresses, and in which the optical discs are of the same outer shape but differ in the recording capacity, wherein the apparatus comprises rotational driving means for rotationally driving the optical disc, optical block movement means for causing movement of an optical block having a converging lens to a predetermined area on the optical disc after focusing pull-in of light through the converging lens to the optical disc, rotationally driven by the rotational driving means, peak holding means for holding a peak level of a high frequency signal detected from the optical block moved by the optical block movement means to the predetermined area of the optical disc, bottom holding means for holding a bottom level of a high frequency signal detected from the optical block moved by the optical block movement means to the predetermined area of the optical disc, difference detection means for detecting the difference between the peak level as held by the peak holding means and the bottom level as held by the bottom holding means, and discriminating means for discriminating the sorts of the optical discs by comparing the magnitude of the difference as detected by the difference detection means to the threshold value. Proper signal processing is selected based on the results of discrimination of the sorts of the optical disc by the discriminating means to record the information on the optical disc.

The present invention also provides an optical disc reproducing apparatus for reproducing the information from one of plural sorts of optical discs in which data are recorded in a groove presenting a wobble or a land of the optical disc, the groove presenting the wobble indicating addresses, and in which the optical discs are of the same outer shape but differ in the recording capacity, wherein the apparatus comprises rotational driving means for rotationally driving the optical disc, optical means for converging the light for reading out data recorded in the wobble of the optical disc on the optical disc by a converging lens, tracking error detecting means for detecting a tracking error signal for the groove, presenting the wobble, from the light focused on the optical disc by the optical means and reflected back from the groove presenting the wobble, total light volume signal detection means for detecting a total light volume signal of a mark recorded on the groove, presenting the wobble, from the reflected light from the groove, presenting the wobble, on which the light has been focused by the optical means, and discriminating means for discriminating the sorts of the optical discs based on phase comparison between a binary coded version of the tracking error signal detected by the tracking error detection means and a binary coded version of the total light volume signal as detected by the total light volume signal detection means. Proper signal processing is selected based on the results of discrimination of the sorts of the optical disc by the discriminating means to reproduce the information from the optical disc.

The present invention also provides an optical disc reproducing apparatus for reproducing the information from plural sorts of optical discs in which data are recorded in a groove presenting a wobble or a land of an optical disc, the groove presenting the wobble indicating addresses, and in which the optical discs are of the same outer shape but differ in the recording capacity, wherein the apparatus comprises rotational driving means for rotationally driving the optical disc, optical means for converging radiated light by a focusing lens on the optical disc, rotationally driven by the rotational driving means, for focusing the so converged light on the optical disc, total light volume signal detection means for detecting a total light volume signal of a mark recorded on the groove, presenting the wobble, from the reflected light from the groove, presenting the wobble, on which the light has been focused by the optical means, comparator means for outputting the results of comparison which is based on an inherent slice level with respect to the total light volume signal as detected by the total light volume signal detection means, and discrimination means for discriminating the sorts of the optical discs in dependence on the results of comparison by the comparator means. Proper signal processing is selected based on the results of discrimination of the sorts of the optical discs by the discriminating means to reproduce the information from the optical disc.

The present invention also provides an optical disc reproducing apparatus in which data are recorded in a groove presenting a wobble or a land, the groove presenting the wobble indicating addresses, and in which the optical discs are of the same outer shape but differ in the recording capacity, wherein the apparatus comprises rotational driving means for rotationally driving the optical disc, an optical block movement means for causing movement of an optical block having a converging lens to a predetermined area on the optical disc after focusing pull-in of light through the converging lens to the optical disc, rotationally driven by the rotational driving means, peak holding means for holding a peak level of a high frequency signal detected from the optical block moved by the optical block movement means to the predetermined area of the optical disc, bottom holding means for holding a bottom level of a high frequency signal detected from the optical block moved by the optical block movement means to the predetermined area of the optical disc, difference detection means for detecting the difference between the peak level as held by the peak holding means and the bottom level as held by the bottom holding means, and discriminating means for discriminating the sorts of the optical discs by comparing the magnitude of the difference as detected by the difference detection means to a threshold value. Proper signal processing is selected based on the results of discrimination of the sorts of the optical disc by the discriminating means to record the information on the optical disc.

Other objects, features and advantages of the present invention will become more apparent from reading the embodiments of the present invention as shown in the drawings.

BRIEF DESCRIPTION OF THE DRAWINGS

FIG. 2 shows design parameters of the first generation MD, next generation MD1 and the next generation MD2.

FIG. 3 shows the data block structure including BIS of the next generation MD1 and the next generation MD2.

FIG. 22A shows a data structure of the ADIP of a third magneto-optical disc and FIG. 22B shows a data structure of the ADIP of a second magneto-optical disc.

FIG. 23 illustrates the processing of embedding a disc control signal in the ADIP signal of the next generation MD2.

BEST MODE FOR CARRYING OUT THE INVENTION

Figure 1:
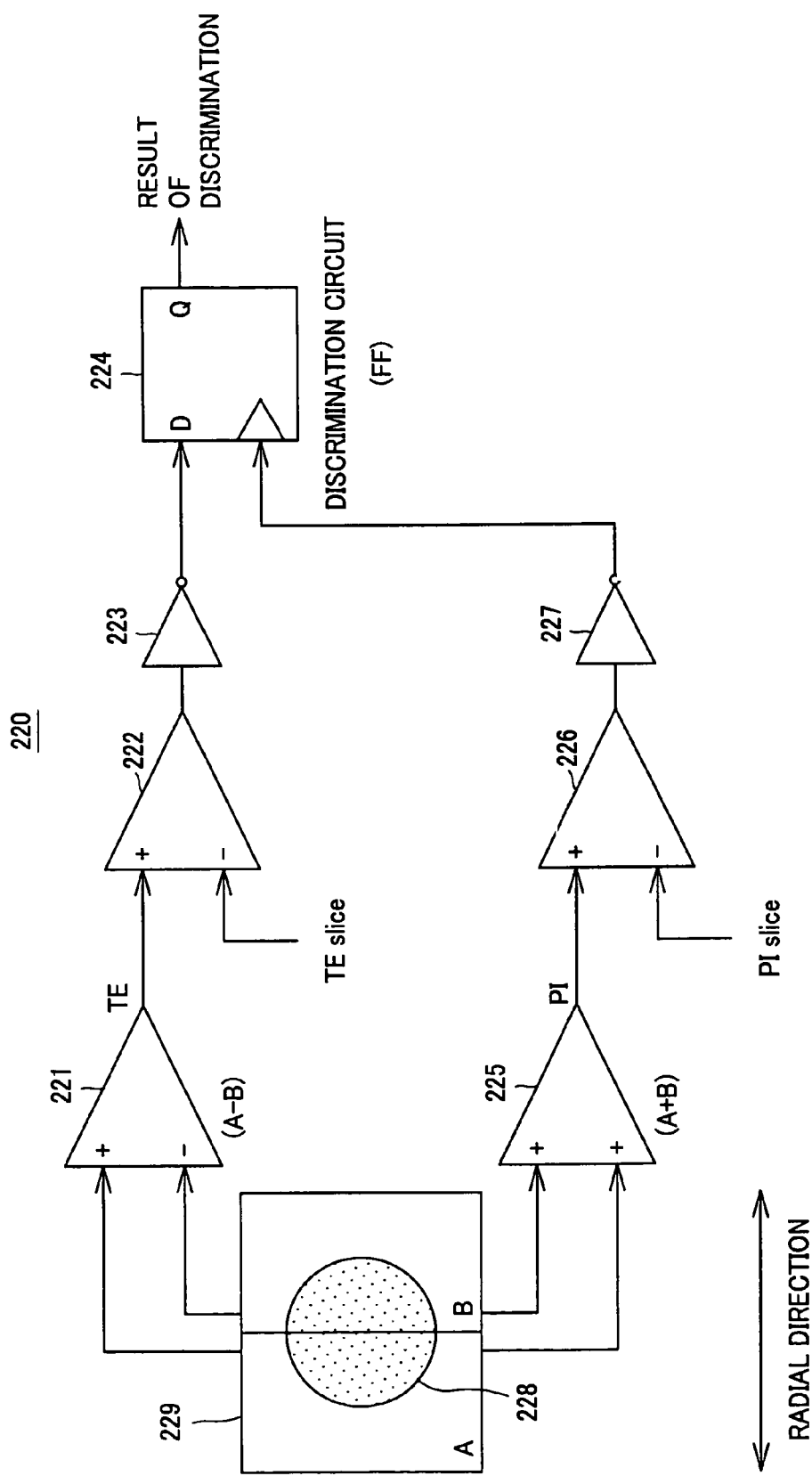
FIG. 1 is a circuit diagram showing an optical disc discriminating apparatus.

Referring to the drawings, a certain preferred embodiment of the present invention is explained in detail.

The preferred embodiment of the present invention is directed to a second magneto-optical disc, developed from the Mini-Disc (registered trademark) MD, and a third magneto-optical disc which is undistinguishable in outer shape from this second magneto-optical disc, as two sorts of disc-shaped magneto-optical discs, in which data is recorded in a wobbled groove or land, an address is indicated by the wobbled groove and in which the recording capacities differ even though the outer shape is the same. As will be explained subsequently, the third magneto-optical disc is larger in recording capacity than the second magneto-optical disc. That is, the optical disc discriminating apparatus of the present embodiment is designed for discriminating the two sorts of the magneto-optical discs of respective different recording capacities from each other. Although the disc-shaped recording medium to be discriminated in the present embodiment is a magneto-optical disc, on which data is recorded by magneto-optical (MO) signals, by way of an example, the disc-shaped recording medium may, of course, be e.g. a an optical disc on which data is recorded by a phase-changed mark. The aforementioned MD is sometimes referred to herein as a first magneto-optical disc.

First, an optical disc discriminating apparatus 220 is explained with reference to FIG. 1. This optical disc discriminating apparatus 220 includes a tracking error signal calculating unit 221 for focusing the light radiated towards the second or third magneto-optical discs, run in rotation by a spindle motor, onto data recorded on a wobbled groove of each of the magneto-optical discs, through a converging lens, and for detecting tracking error signals of light with respect to a mark, recorded on the wobbled groove, from the light reflected from the wobbled groove on which the light has been focused. The optical disc discriminating apparatus 220 also includes a pull-in signal calculating unit 225 for detecting a total light volume signal PI of the mark recorded on the wobbled groove from the light reflected from the wobbled groove on which the light ha been focused, and a D-flipflop discriminating circuit 224 for discriminating the sort of the magneto-optical disc by phase comparison between the binary coded version of the tracking error signals detected by the tracking error signal calculating unit 221 and the binary coded version of the total light volume signal PI detected by the pull-in signal calculating unit 225. It is noted that a spot SP228 of the reflected light is illuminated on a photodetector (PD) 229, with the light volume thereof being converted into electrical signals A, B corresponding to the light volume. These electrical signals A, B are supplied to the tracking error signal calculating unit 221 and to the pull-in signal calculating unit 225. The detailed structure and operation of the optical disc discriminating apparatus 220 will be explained subsequently.

First, a magneto-optical disc, to be discriminated by the optical disc discriminating apparatus 220, is now explained by referring to FIGS. 2 to 5. When the aforementioned first magneto-optical disc is termed the first generation MD, the second magneto-optical disc has achieved an increased recording capacity, and may be termed the next generation MD1. The third magneto-optical disc has achieved an increased recording capacity by application of a novel recording system to the novel recording medium, capable of recording to high density, and may be termed the next generation MD2.

Referring to FIG. 2, certain design parameters of the first, second and the third magneto-optical discs are explained. Although the optical disc discriminating apparatus 220 does not discriminate the first magneto-optical disc, it is referred to only for reference sake. Meanwhile, the optical disc discriminating apparatus, which will be explained later, discriminates the first and the second magneto-optical discs from each other.

The physical design parameters of the second magneto-optical disc as the recording medium are the same as those of the aforementioned conventional first magneto-optical disc. Consequently, with the second magneto-optical disc, the track pitch is 1.6 μm, the laser light wavelength λ=780 nm, and the numerical aperture of the optical head NA=0.45. The recording system used is the groove recording system, while the addressing system used is the ADIP system. Thus, the structure of the optical system, ADIP address readout system and the servo processing in the disc drive device are the same as those of the aforementioned first magneto-optical disc, so that the second magneto-optical disc is compatible to the conventional disc.

The second magneto-optical disc uses, as the modulation system for recording data, the RLL (1-7) PP modulation system, suited to high density recording. Meanwhile, RLL denotes Run Length Limited, while PP denotes Parity preserve/Prohibit rmtr (repeated minimum transition runlength). As the error correction system, an RS-LDC (Reed Solomon-Long Distance Code) with BIS (Burst Indicator Subcode) with a higher correction capability is used.

Figure 4:
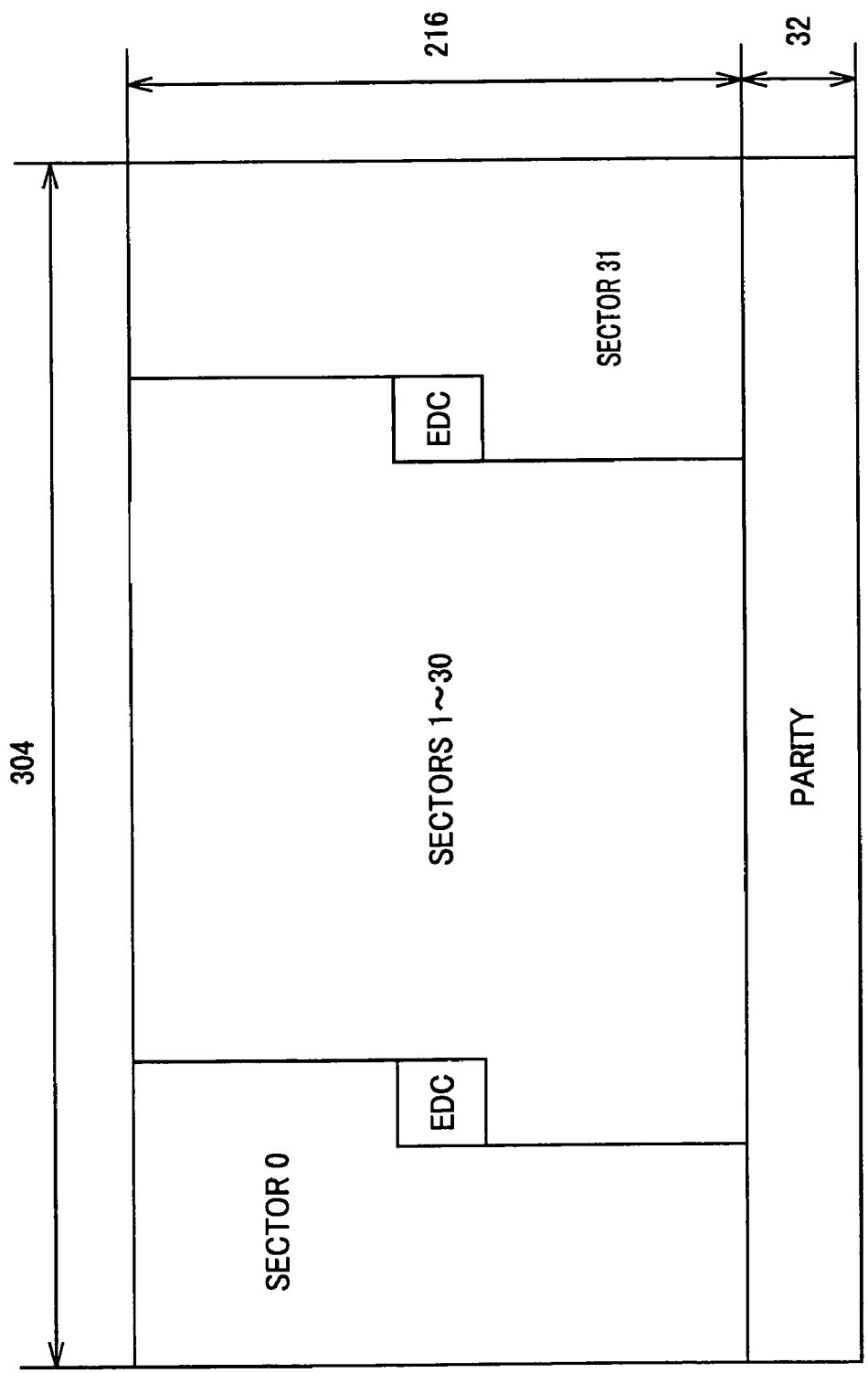
FIG. 4 shows the ECC format for a data block of the next generation MD1 and the next generation MD2.

Specifically, 2048 bytes of user data, supplied from e.g. a host application, and 4 bytes of EDC (Error Detection Code) appended thereto, totaling at 2052 bytes, make up one sector (data sector distinct from the physical sector on the disc as later explained). 32 of these sectors, namely the sector 0 to sector 31, make up one block of 304 columns by 216 rows, as shown in FIG. 4. The 2052 bytes of the respective sectors are scrambled such as to take exclusive OR (Ex-OR) with preset pseudo random numbers. 32 bytes of parity are appended to each column of each scrambled block to form an LDC (Long Distance Code) of 304 columns by 248 rows. This LDC block is interleaved to give a block of 152 columns by 496 rows (Interleaved LDC Block). Four sets each of 38 columns are arrayed, with one column of the above-mentioned BIS in-between, to give an array of 155 columns by 496 rows, and 2.5 bytes of the frame synchronization code (Frame Sync) are appended to a leading position of each column so that one column is associated with one frame in order to give an array of 157.5 bytes by 496 frames, as shown in FIG. 3. The respective rows of FIG. 3 are associated with 496 frames of from Frame 10 to Frame 505 of the data area in one recording block (cluster) shown in FIG. 21 as explained later.

In the above-described data structure, data interleaving is of the block completion type. This gives data redundancy of 20.50%. The data detection system is the viterbi decoding system by PR (1,2,1) ML.

As the disc driving system, the CLV system is used, with the line speed being 2.4 n/sec. The standard data rate at the time of recording and/or reproduction is 4.4 MB/sec. With this system, the total recording capacity can be 300 MB. With the use of the RLL (1-7) PP modulation system, in lieu of EFM, as the modulation system, the window margin may be 0.666 from 0.5, thus achieving a high density by a factor of 1.33. The cluster, as the minimum rewrite unit of data, is made up by 16 sectors (64 kB).

Thus, by employing the RS-LDC system with BIS, employing a different sector structure and viterbi decoding, as the recording modulating system, in lieu of the CIRC system, the data efficiency can be raised to 79.5%, from 53.7%, thus achieving a high density by a factor of 1.48.

By virtue of the above features, taken together, the recording capacity of the second magneto-optical disc can be 300 MB which is about twice that of the first magneto-optical disc.

On the other hand, the third magneto-optical disc is a recording medium exploiting a high density recording technique, such as DWDD (Domain Wall Displacement Detection), and has a physical format different from that of the above-described first magneto-optical disc or that of the second magneto-optical disc. This next generation MD2 has a track pitch of 1.25 $\mu$m and a bit length of 0.16 $\mu$m/bit and is densified along the line direction.

Moreover, for compatibility with the first and second magneto-optical discs, the optical system, readout system and the servo processing are the same as those of the prevailing standard. Specifically, the laser wavelength $\lambda$ is such that $\lambda$= 780 nm, the numerical aperture of the optical head is such that NA=0.45. The recording system is the groove recording system, while the addressing system is that exploiting the ADIP. The outer shape of the casing is of the same standard as that of the first and the second magneto-optical discs.

If, with the use of an optical system equivalent to that for the first and the second magneto-optical discs, the track pitch and line density (bit length) narrower than with the conventional system are read as described above, it is necessary to resolve the constraint conditions as to the detracking margin, crosstalk from the land and the groove, defocusing, or CT signals. Thus, the third magneto-optical disc is featured by the depth, inclination or the width of the groove which have been changed. Specifically, the depth, tilt and the width of the groove are defined to be 160 to 180 nm, 60° to 70° and to 600 to 800 nm, respectively.

The third magneto-optical disc similarly uses the RLL (1-7) PP modulation system (RLL, Run Length Limited; PP, Parity preserve/Prohibit rmtr (repeated minimum transition runlength)), suited to high density recording, as the modulating system for the recording data. The third magneto-optical disc also uses the RS-LDC (Reed Solomon-Long Distance Code) system with BIS (Burst Indicator Subcode) of a higher error correction capability, as an error correction system. This RS-LDC is the same as that explained with reference to FIGS. 3 and 4.

The data interleaving is the block completion type, whereby data redundancy is 20.50%. As the data detection system, the viterbi decoding system by PR (1, −1) ML is used. The cluster, the minimum data rewrite unit, is made up by 16 sectors or 64 kB.

The disc drive system used is the ZCAV system, with the line velocity being 2.0 m/sec. The standard data rate during recording and/or reproduction is 9.8 MB/sec. Thus, with the magneto-optical disc, employing the DWDD system and this driving system, the total recording capacity may be 1 GB.

Figure 5:
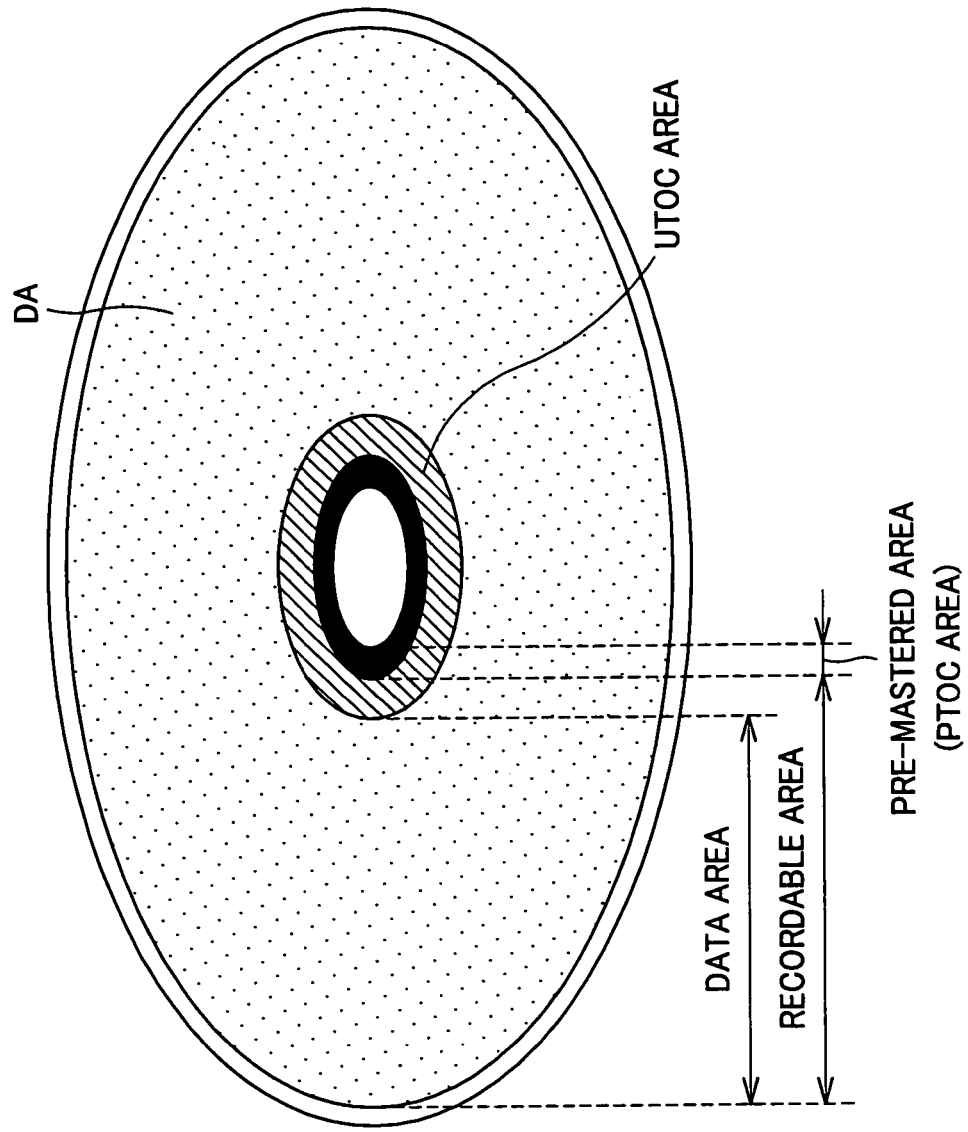
FIG. 5 schematically shows an illustrative area structure on a disc surface of the next generation MD1.

An illustrative area structure on the disc surface of the second magneto-optical disc, shown in the present specified embodiment, is schematically shown in FIG. 5. The second magneto-optical disc is the same recording medium as the first magneto-optical disc. On the innermost rim of the disc, there is provided the PTOC (Premastered Table of Contents or Premastered TOC) as a premastered area. Here, the disc management information is recorded as embossed bits by physical structure modification.

Radially outwardly of the pre-mastered area, there is provided a magneto-optically recordable area, that is a recordable and/or reproducible area provided with a groove as a guide groove for a recording track. The radially innermost side of this recording area is a UTOC (User Table Of Contents) area. In this UTOC area, there are provided a buffer area with respect to the premastered area and a power calibration area used e.g. for adjusting the output power of the laser light output.

Figure 6:
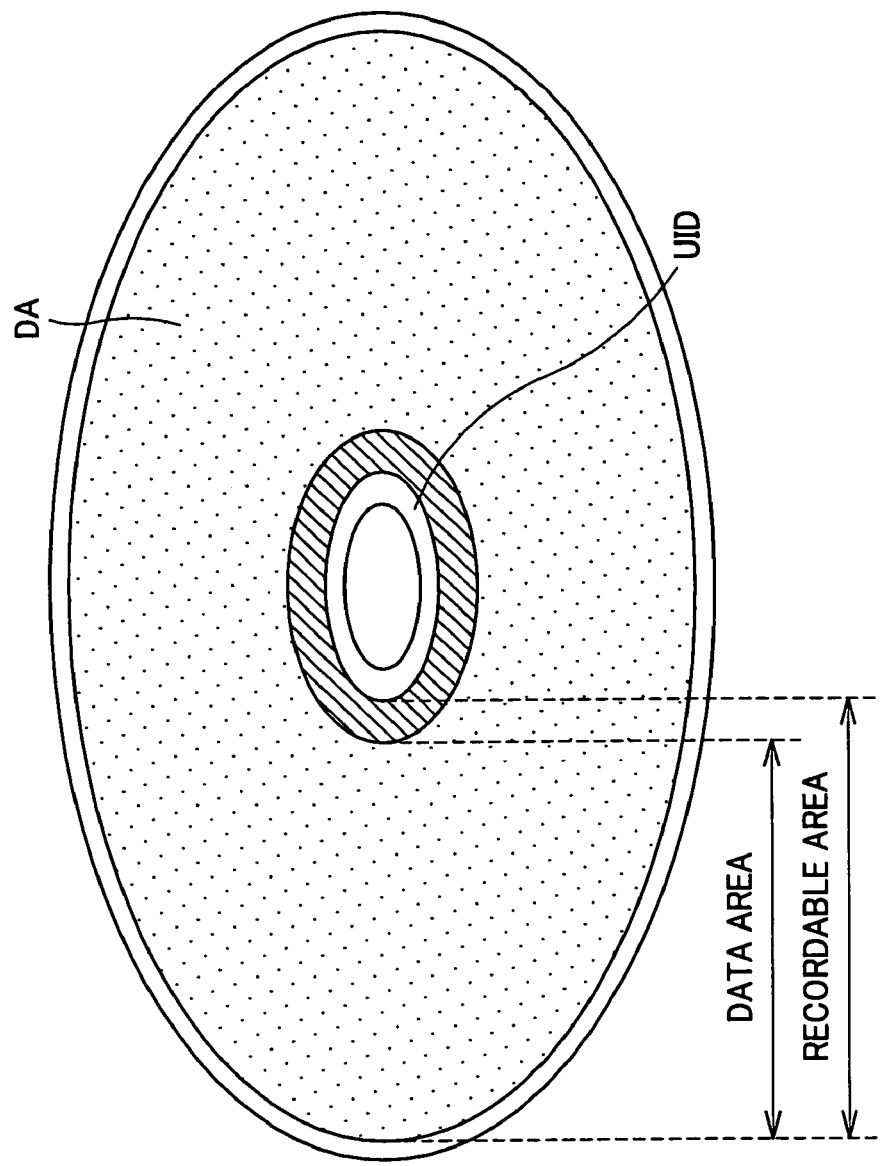
FIG. 6 schematically shows an illustrative area structure on a disc surface of the next generation MD2.

With the third magneto-optical disc, no pre-bits are used, for achieving a high density, as shown in FIG. 6. Thus, in the third magneto-optical disc, there is no PTOC area by pre-bits. In the third magneto-optical disc, there is provided, inwardly of a recordable area, a UID area for recording the information for copyright protection, the information for checking data tampering or the unique ID (UID) as a basis for other information that is not laid open. In this UID area, recordings are made in accordance with a recording system different from the DWDD system applied to the third magneto-optical disc.

Meanwhile, an audio track for music data and a data track may be made co-recordable on the second magneto-optical disc and on the third magneto-optical disc. In this case, an audio recording area AA, comprised of at least one audio track, recorded therein, and a recording area for PC data, comprised of at least one data track, recorded therein, are formed in the data area, as shown for example in FIG. 7.

Figure 7:
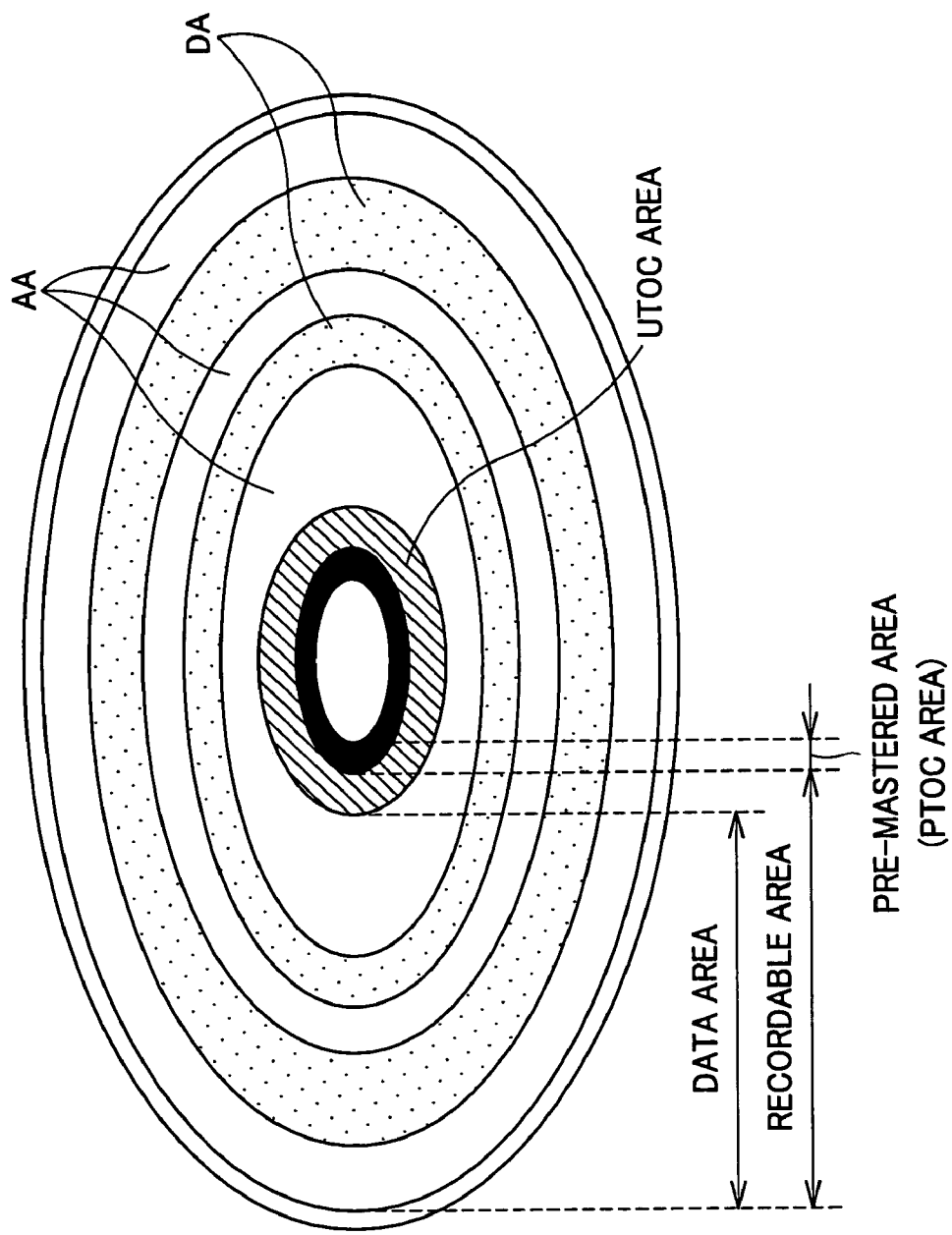
FIG. 7 shows an illustrative area structure for illustrating an exemplary area structure in which an audio track for music data and a data track may be co-recorded in the next generation MD1 and the next generation MD2.

There is no necessity for a set of audio or data tracks to be recorded in a physically consecutive fashion on the disc, but may be recorded partitioned in plural parts, as shown in FIG. 7. The part denotes a domain where the data are recorded in a physically consecutive fashion. That is, if there are two physically separated PC data recording areas DA, as shown in FIG. 7, the number of the data tracks may be one or plural. Although FIG. 7 is shown for the second magneto-optical disc, the same application may be made with respect to the third magneto-optical disc.

The detailed structure and the operation of the optical disc discriminating apparatus 220, used for discriminating the above-described second and third magneto-optical discs from each other, are now explained with reference to FIGS. 1 and 8 to 13.

The optical disc discriminating apparatus 220 is enclosed within a medium driving unit 11, shown in FIG. 12, which will be explained subsequently. In actuality, the main constituent portions of the optical disc discriminating apparatus are provided in a distributed fashion in the optical head 22, RF amplifier and a driving controller 41. Additionally, this optical disc discriminating apparatus 220 is moved in a laser light focus-on state which is realized by the light condensing means (objective lens) within the optical head 22. The tracking servo is not applied.

Light receiving signals A, B, detected by a photodetector PD, housed within the optical head 22, are supplied to the tracking error signal calculating unit 221 and to the pull-in signal calculating unit 225 shown in FIG. 1.

The tracking error signal calculating unit 221 calculates a push-pull signal (A–B), obtained on subtracting the light receiving signal B from the light receiving signal A, as a tracking error signal TE, and routes the so calculated signal to a comparator 222, as a binary coding means.

The pull-in signal calculating unit 225 sends the total light volume signal (A+B), obtained on summing the light receiving signals A, B, as a pull-in signal PI, to a comparator 226.

The comparator 222 binary-encodes the tracking error signal TE to a slicing level TEslice, and routes the resulting binary-coded data TEcomp to an inverter 223. The inverter 223 complements the binary-coded data TEcomp to route the resulting signal to a data input terminal D of the D-flipflop discriminating circuit 224.

The comparator 226 binary-codes the push-pull signal PI, by comparing the push-pull signal to the slice level PIslice, to route the resulting binary-coded data PIcomp to an inverter 227. The inverter 227 complements the binary-coded data PIcomp to route the resulting data to the clock input terminal of the D-flip-flop discriminating circuit 224.

The D-flipflop discriminating circuit 224 latches the complemented binary-coded data TEcomp' from the comparator 222 in synchronism with the rising edge of the complemented binary-coded data PIcomp' from the comparator 226. That is, the discriminated result, indicating the result of discrimination of the disc sort, obtained on detecting the phase difference of the PI signal and the TE signal, is generated and output. This D-flipflop discriminating circuit 224 is housed within the driving controller 41 as later explained. The driving controller 41 discriminates the sort of the magneto-optical disc, based on the result of discrimination by this D-flipflop discriminating circuit 224.

Figure 8:
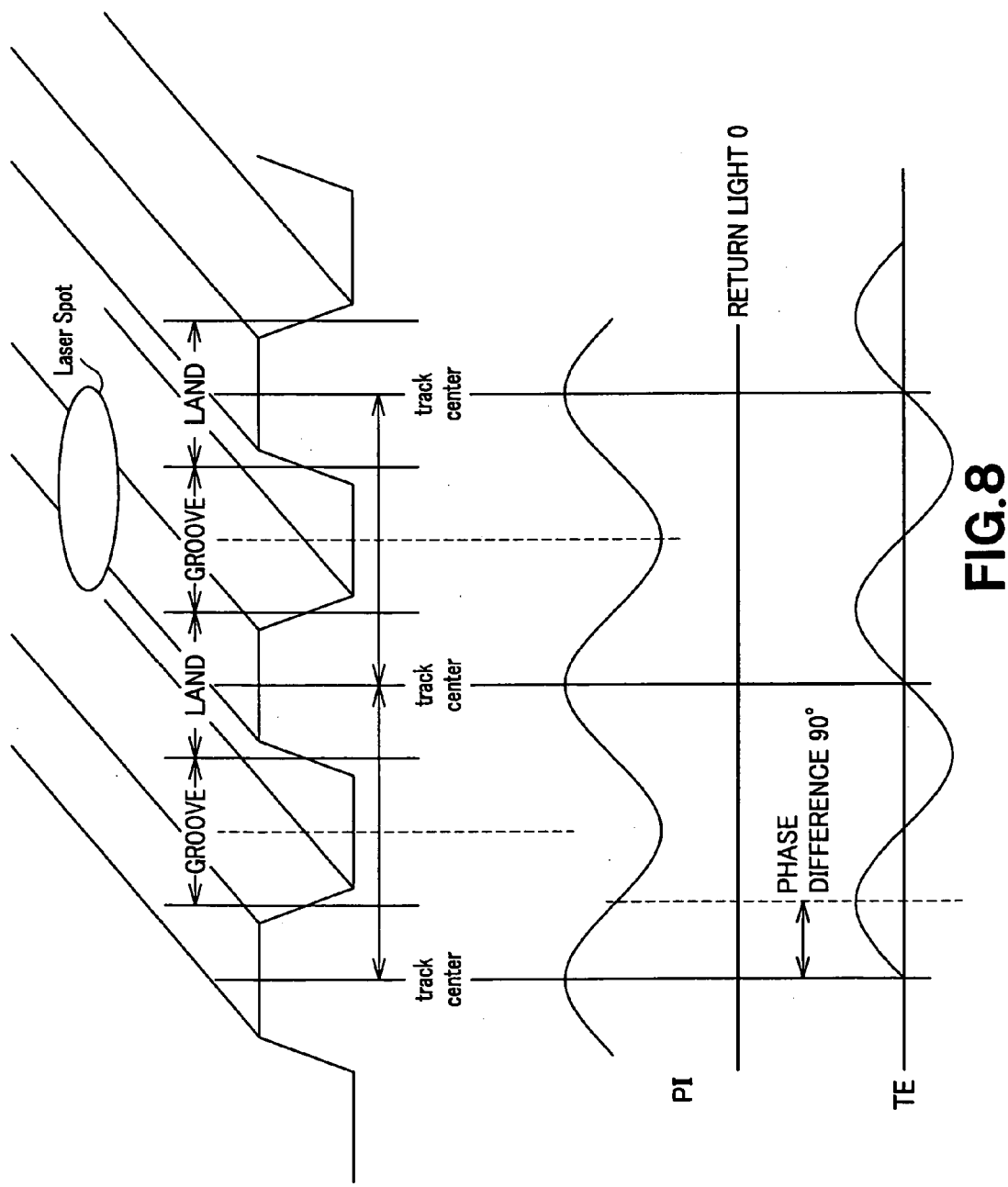
FIG. 8 illustrates the movement of a light spot SP on the cross-section of an MD and PI and replay waveform of PI and TE signals in relation to the spot movement.

FIG. 8 shows the movement of a light spot SP in a cross-section of the magneto-optical disc and reproduced waveforms of the PT and TE signals responsive to the movement of the light spot SP. This figure shows a case where the TE signal lags behind the PI signal, that is, has a phase difference of 90°.

Figure 9:
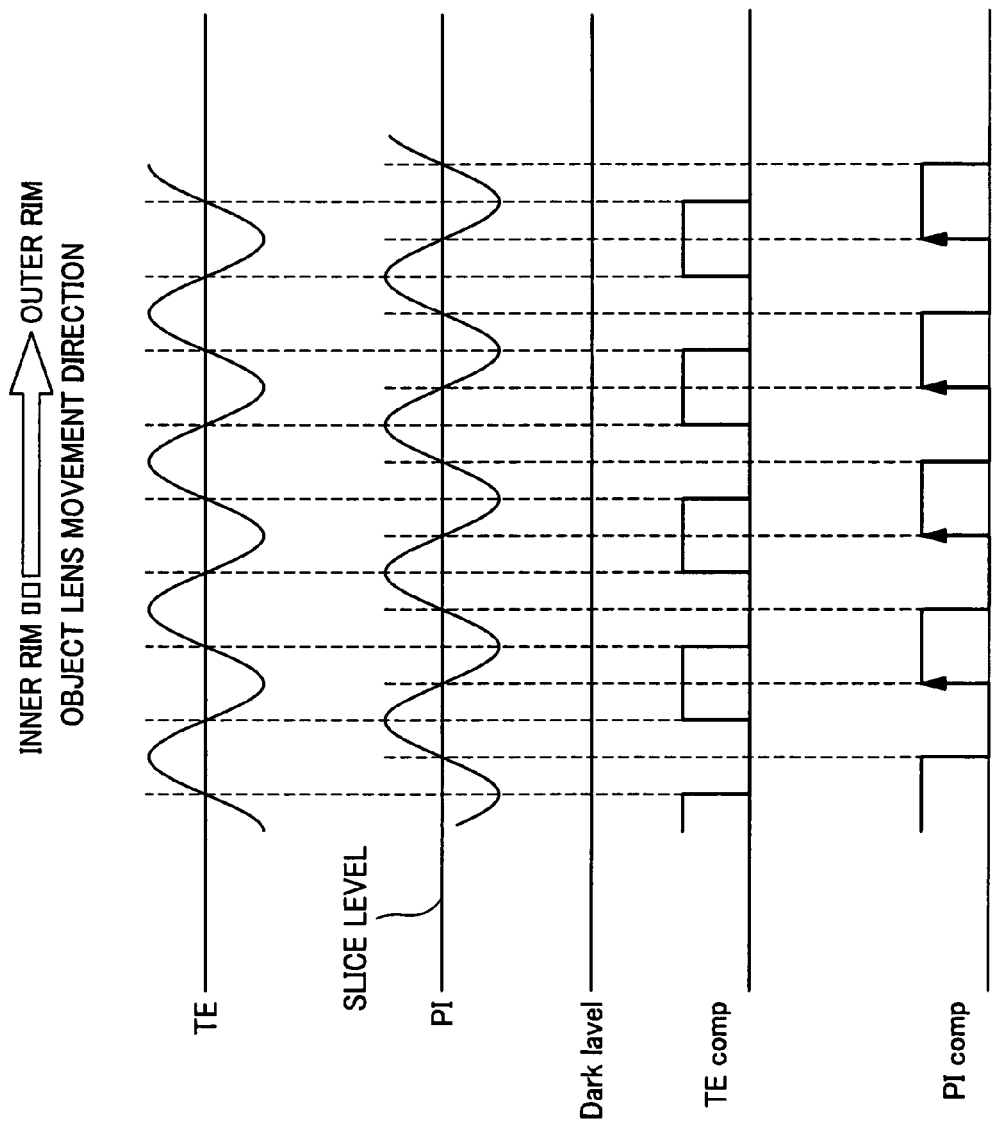
FIG. 9 shows the waveforms detected in various portions of an optical disc discriminating apparatus for the next generation MD1.

FIG. 9 shows the waveform detected in each part of the optical disc discriminating apparatus 220 in relation to the second magneto-optical disc. On latching the complemented binary-coded data TEcomp' in synchronism with the rising edge of the complemented binary-coded data PIcomp', the D-flip-flop discriminating circuit 224 outputs a H level.

Figure 10:
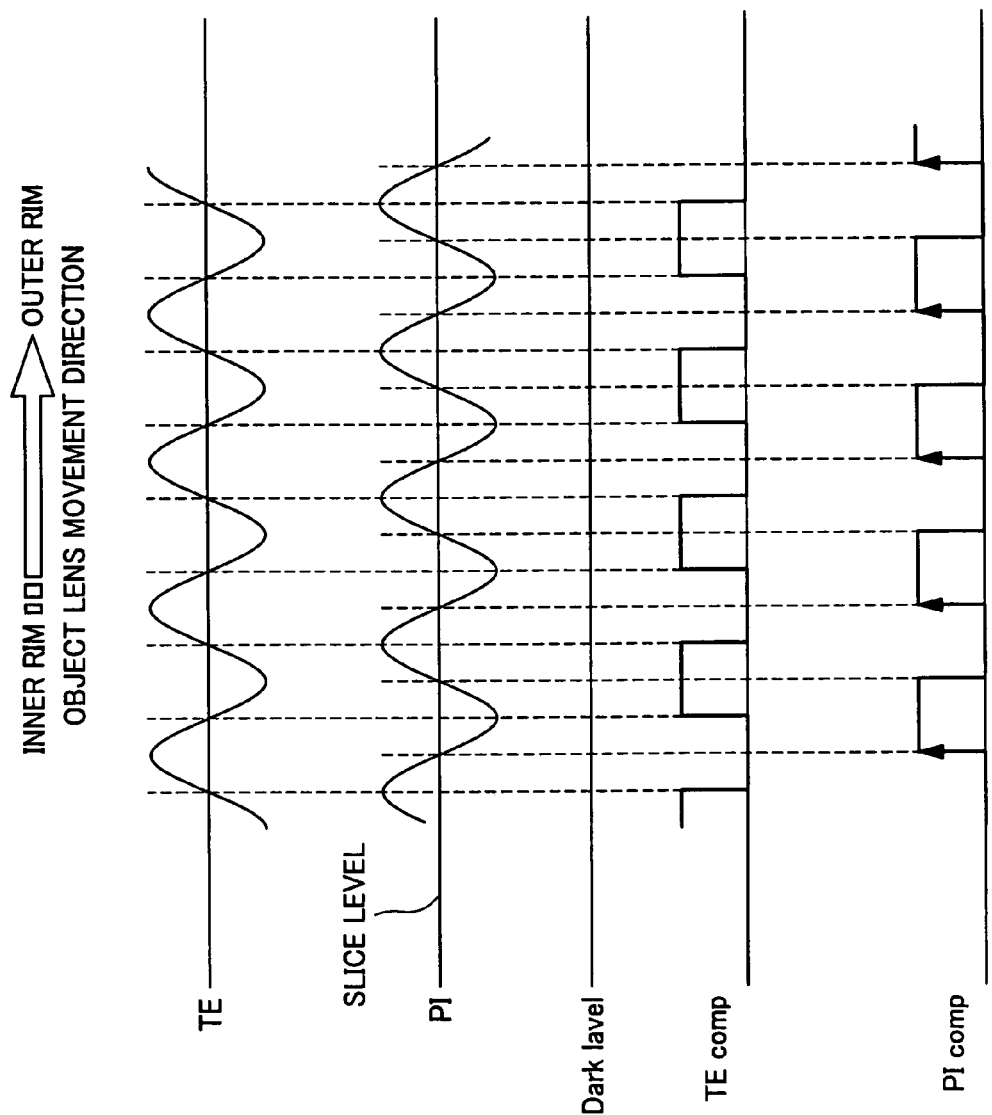
FIG. 10 shows the waveforms detected in various portions of an optical disc discriminating apparatus for the next generation MD2.
Figure 11:
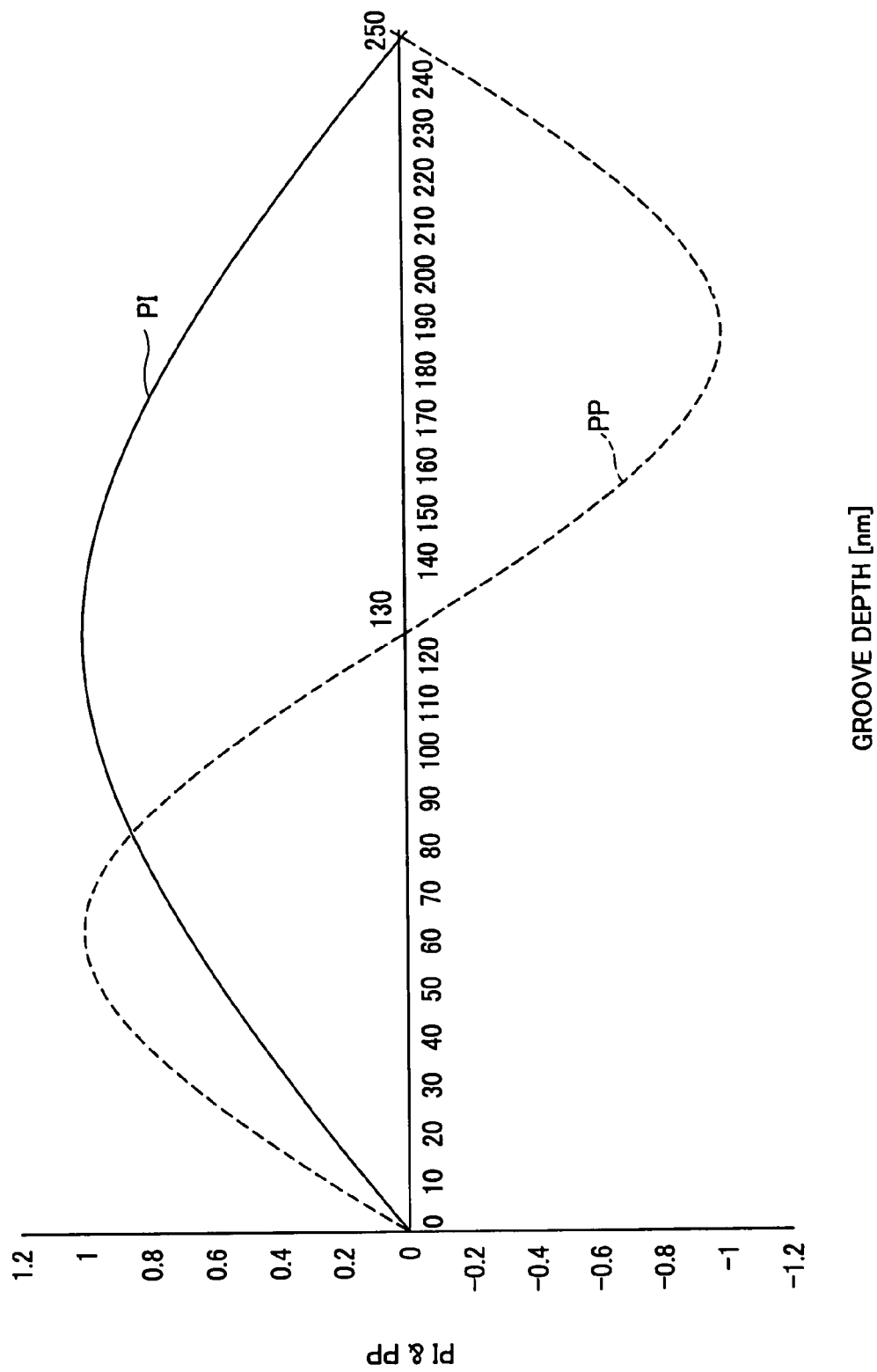
FIG. 11 illustrates polarity inversion of the TE signal in the next generation MD2.

FIG. 10 shows the waveform detected in each part of the optical disc discriminating apparatus 220 in relation to the movement of the third magneto-optical disc. On latching the complemented binary-coded data TEcomp' in synchronism with the rising edge of the complemented binary-coded data PIcomp', the D-flipflop discriminating circuit 224 outputs an L level. The TE signal in the third magneto-optical disc is inverted in polarity because the groove depth in the third magneto-optical disc is deep and is 160 to 180 nm. It is because the amplitude of the tracking error signal is changed over from + to − with the groove depth of 125 nm as a boundary, as shown in FIG. 11. The depth d, at which this polarity inversion occurs, may be found from (78/4)/1.57, where 780 is the laser wavelength in nm and 1.57 is the refractive index of the laser light.

In actuality, the disc suffers from offset, so that, except when the tracking servo is applied, the light spot SP is repeatedly moved towards the inner rim or towards the outer rim of the optical disc. Thus, the proceeding direction needs to be determined, and hence the objective lens or the optical block (optical head) in its entirety is moved from the inner rim towards the outer rim at a constant velocity, and detection is made as a velocity which overcomes the amount of movement ascribable to the offset.

The disc driving device which has the optical disc discriminating apparatus 220 enclosed therein and which discriminates the second and the third magneto-optical discs from each other to record and/or reproduce the information for the respective discs in dependence on the discriminated results, is now explained with reference to FIGS. 12 and 13.

The disc driving device 10 can be connected to a personal computer (PC) 100, and is capable of using the second and the third magneto-optical discs not only as audio data but also as external storage such as PC.

Figure 12:
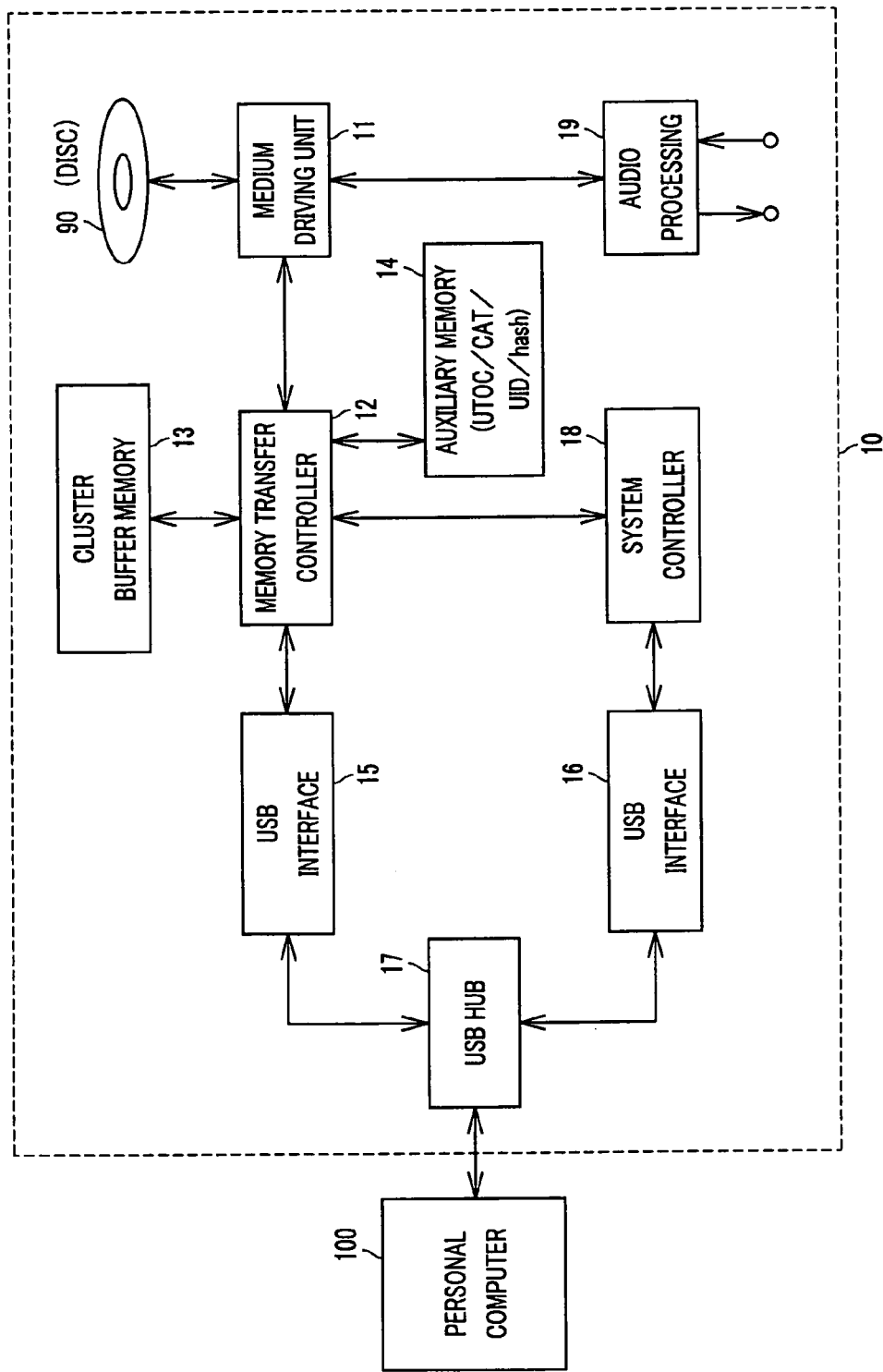
FIG. 12 is a block diagram showing the structure of a disc drive device.

Referring to FIG. 12, the disc driving device 10 includes the medium driving unit 11, having enclosed therein the optical disc discriminating apparatus 220, a memory transfer controller 12, a cluster buffer memory 13, an auxiliary memory 14, a USB interfaces 15, 16, a USB HUB 17, a system controller 18 and an audio processing unit 19.

The medium driving unit 11 records and/or reproduces for one 90 of a variety of discs, such as the first magneto-optical disc, the second magneto-optical disc or the third magneto-optical disc. The inner structure of the medium driving unit 11 will be explained later in FIG. 13.

The memory transfer controller 12 controls transmission and reception of replay data from the medium driving unit 11 and recording data supplied to the medium driving unit 11. The cluster buffer memory 13 buffers the data read out on the high density data cluster basis from the data track of the disc 90 by the medium driving unit 11, under control by the memory transfer controller 12. The auxiliary memory 14 memorizes a variety of the management information and the special information, such as UTOC data, CAT data, unique ID or hash values, under control by the memory transfer controller 12.

The system controller 18 is capable of communication with the PC 100, connected thereto over the USB interface 16 and the USB HUB 17, and performs communication control with this PC 100 to receive commands, such as write or readout requests, transmit the needed information, such as status information, and other information, or to manage integrated control of the disc driving device 10 in its entirety.

If the disc 90, for example, is loaded in the medium driving unit 11, the system controller 18 commands the medium driving unit 11 to read out the management information from the disc 90, in order to cause the management information read out from the memory transfer controller 12 to be stored in the auxiliary memory 14.

The system controller 18 is able to grasp the track recording state of the disc 90 by reading-in these management information. Moreover, by reading-in the CAT, the system controller 18 is able to grasp the high density data cluster structure in the data track, such that the system controller 18 is able to cope with the access request for the data track from the PC 100.

Based on the unique ID value or the hash value, the system controller is able to execute the disc authentication or other processing operations or to transmit these values to the PC to cause the PC 100 to execute disc authentication processing and other processing operations.

When a readout request for a FAT sector is made from the PC 100, the system controller 18 gives a signal to the medium driving unit 11 to the effect that readout of the high density data cluster including this FAT sector is to be executed. The high density data thus read out is written by the memory transfer controller 12 in the cluster buffer memory 13. However, if data of the FAT sector has already been stored in the cluster buffer memory 13, readout by the medium driving unit 11 is not needed.

From data of the high density data cluster, written in the cluster buffer memory 13, the system controller 18 gives a signal for reading out the data of the FAT sector, as requested, to manage control to transmit the data of the FAT sector to the PC 100 via USB interface 15 and the USB HUB 17.

When a write request for a FAT sector is made from the PC 100, the system controller 18 causes the medium driving unit 11 to read out the high density data cluster containing this FAT sector. The high density data cluster, thus read out, is written by the memory transfer controller 12 in the cluster buffer memory 13. However, if the data of the FAT sector has already been stored in the cluster buffer memory 13, no readout by the medium driving unit 11 is needed.

The system controller 18 also causes the data of the FAT sector, transmitted from the PC 100 (recording data), to be supplied through the USB interface 15 to the memory transfer controller 12 to execute rewriting of the corresponding FAT sector data on the cluster buffer memory 13.

The system controller 18 commands the memory transfer controller 12 to transfer the data of the high density data cluster, stored in the cluster buffer memory 13 with the needed FAT sector in a rewritten state, to the medium driving unit 11 as recording data. The medium driving unit 11 writes the recording data of the high density data cluster on the medium, loaded in position, as it modulates the recording data in accordance with the EFM modulation system if the medium is the first magneto-optical disc or in accordance with the RLL (1-7) PP modulation system if the medium is the second magneto-optical disc or the third magneto-optical disc.

Meanwhile, in the disc driving device 10, the aforementioned recording and/or reproduction control is the control in recording and/or reproducing a data track. The data transfer in recording and/or reproducing the MD audio data (audio track) is via audio processing unit 19.

As an inputting system, the audio processing unit 19 includes an analog speech signal inputting unit, such as a line input circuit/microphone input circuit, an A/D converter and a digital audio data input unit. The audio processing unit 19 includes an ATRAC compression encoder/decoder and a buffer memory for compressed data. The audio processing unit 19 also includes, as an output system, an analog speech signal output unit, such as a digital audio data output unit, a D/A converter or a line output circuit/headphone unit.

It is when the digital audio data (or the analog speech signal) is supplied to the audio processing unit 19 that an audio track is recorded on the disc 90. The input linear PCM digital audio data, or the linear PCM digital audio data supplied in the form of an analog speech signal and subsequently converted by the A/D converter, is ATRAC compression encoded and stored in the buffer memory. The audio data then is read out from the buffer memory at a predetermined timing (data unit corresponding to the ADIP cluster) so as to be transferred to the medium driving unit 11.

The medium driving unit 11 modulates the transferred compressed data in accordance with the first modulation system, EFM modulation system or the RLL (1-7) PP modulation system, to write the modulated data as audio track on the disc 90.

In reproducing the audio track from the disc 90, the medium driving unit 11 demodulates the replay data to the state of the ATRAC compressed data to transfer the demodulated data to the audio processing unit 19. This audio processing unit 19 performs ATRAC compression decoding on the data to turn the data into linear PCM audio data which is then output at a digital audio data output unit. Or the audio processing unit converts the data into analog speech signals which are then output to a line output/headphone output.

It should be noted that the structure shown in FIG. 12 is merely illustrative. For example, if the disc driving device 10 is connected to the PC 100 so as to be used as an external storage device adapted for recording and/or reproducing only data tracks, the audio processing unit 19 is not needed. On the other hand, if recording and/or reproduction of audio signals is the principal target, it is preferable that there is provided the audio processing unit 19 and further there are provided an operating unit and a display unit as a user interface. For connection to the PC 100, not only the USB but also the so-called IEEE1394 interface pursuant to the provision as provided for by the IEEE (The Institute of Electrical and Electronics Engineers, Inc.) or the general-purpose connection interface may be used.

Figure 13:
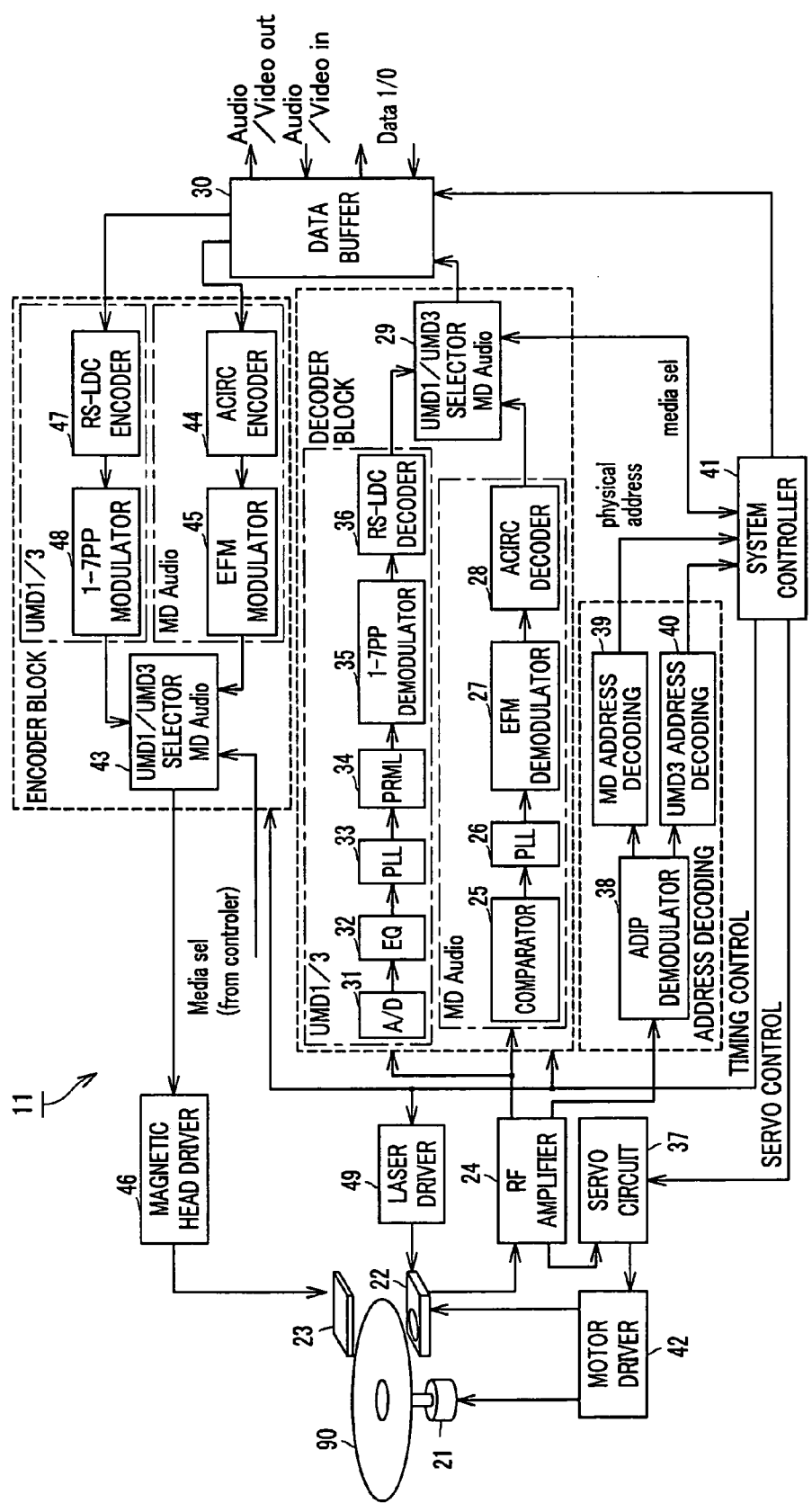
FIG. 13 is a block diagram showing the inner structure of the medium driving unit.

The structure of the medium driving unit 11 for recording and/or reproducing the first, second and the third magneto-optical discs is explained in further detail by referring to FIG. 13. In this medium driving unit 11, the optical disc discriminating apparatus 220 discriminates the second and the third magneto-optical discs from each other. It is noted that, with a modification of the optical disc discriminating apparatus, it is the first and the third magneto-optical discs that are discriminated from each other.

The medium driving unit 11 is featured by including, for recording and/or reproducing the first, the second and the third magneto-optical discs, an arrangement for executing EFM modulation and ACIRC encoding for recording the first magneto-optical disc and an arrangement for executing the RLL (1-7) PP modulation and RS-LDC encoding for recording the second and the third magneto-optical discs. The medium driving unit 11 is also featured by including, as a replay processing system, an arrangement for executing EFM demodulation and ACIRC decoding for reproducing the first magneto-optical disc and an arrangement for executing RLL (1-7) demodulation RS-LDC decoding based on data detection employing PR (1,2,1) ML and viterbi decoding for reproducing the second and the third magneto-optical discs.

In the medium driving unit 11, a disc 90 loaded thereon is rotationally driven by the spindle motor 21 in accordance with the CLV system or the ZCAV system. During recording and/or reproduction, laser light is illuminated from the optical head 22 on the disc 90.

The optical head 22 outputs high level laser light for heating the recording track to the Curie temperature during recording, while outputting laser light of a relatively low level for detecting the data from the reflected laser light by the magnetic Kerr effect. To this end, a laser diode as laser outputting means, an optical system including a polarizing beam splitter and an objective lens, and a detector for detecting the reflected light, are mounted on the optical head 22. The objective lens, mounted to the optical head 22, is held by for example a biaxial mechanism for displacement in the radial direction of the disc and in a direction towards and away from the disc. The optical head 22 is provided with a photodetector PD for supplying a received light signal A and a received light signal B in the optical disc discriminating apparatus 220. Since it is necessary to determine the proceeding direction, at the time of discriminating the optical disc, the objective lens or the entire optical head 22 is moved at a constant velocity from an inner rim towards an outer rim of the optical disc. The received light signal A and the received light signal B may be detected at a speed sufficient to overcome the amount of movement caused by the offset.

In the present embodiment, a phase compensation plate is provided on the readout light path of the optical head 22 in order to develop the maximum replay characteristics for the first and the second magneto-optical discs and the third magneto-optical disc having different physical design parameters on the medium surface. By this phase compensation plate, the bit error rate during readout may be optimized.

A magnetic head 23 is arranged in a location facing the optical head 22 with the disc 90 in-between. The magnetic head 23 applies a magnetic field, modulated by recording data, to the disc 90. Although not shown, a sled motor and a sled mechanism are provided for causing movement of the optical head 22 in its entirety and the magnetic head 23 along the radius of the disc. When the optical disc discriminating apparatus discriminates the optical disc, the sled motor and the sled mechanism are moved from the inner rim towards the outer rim of the optical head 22.

The medium driving unit 11 is provided with a recording processing system, a reproducing processing system and a servo system, in addition to the recording and/or reproducing head system composed of the optical head 22 and the magnetic head 23, and to the disc rotating driving system by the spindle motor 21. As the recording processing system, there are provided a unit responsible for EFM modulation and ACIRC encoding at the time of recording on a first magneto-optical disc and a unit responsible for RLL(1-7) PP modulation RS-LDC encoding at the time of recording on the second and the third magneto-optical discs.

When the optical disc discriminating apparatus discriminates the sort of the optical disc, the disc rotating and driving system runs the second and the third magneto-optical discs in rotation.

As the reproducing processing system, there are provided a section responsible for demodulation as a counterpart operation for EFM modulation, and ACIRC decoding at the time of reproducing the first magneto-optical disc, and a unit responsible for demodulation (PR (1,2,1) ML and RLL (1-7) demodulation based on data detection employing viterbi decoding) and for RS-LDC decoding, as a counterpart operation for the RLL (1-7) PP modulation at the time of reproducing the second and third magneto-optical discs.

The information detected as the reflected light of the illuminated laser light on the disc 90 of the optical head 22 (optical current obtained on detecting the reflected laser light by the photodetector) is routed to an RF amplifier 24. This RF amplifier 24 executes current-voltage conversion, amplification and matrix calculations on the input detected information to extract the replay RF signals, tracking error signals TE, focusing error signals and the groove information (ADIP information recorded on the disc 90 by track wobbling) as the replay information.

In this RF amplifier 24, there are enclosed a tracking error signal calculating unit 221, making up the optical disc discriminating apparatus 220, a pull-in signal calculating unit 225, and comparator 222 and 226.

For reproducing the first magneto-optical disc, the replay RF signals, obtained in the RF amplifier, are processed through the comparator 25 and the PLL circuit 26 by an EFM demodulating unit 27 and an ACIRC decoder 28. The replay RF signals are turned into bi-level signals by the EFM demodulating unit 27 and turned into an EFM signal string, which then is EFM demodulated, corrected for errors and deinterleaved in the ACIRC decoder 28. If the signals are audio data, the data at this time point are ATRAC compressed data. At this time, the first magneto-optical disc signal side of the selector 29 is selected and the demodulated ATRAC compressed data are output as replay data from the disc 90 to the data buffer 30. In this case, the compressed data is supplied to the audio processing unit 19, shown in FIG. 12.

On the other hand, in reproducing the second magneto-optical disc or the third magneto-optical disc, the replay RF signals, obtained by the RF amplifier, are processed by an RLL (1-7) PP demodulating unit 35 and an RS-LDC decoder 36, via an A/D converting circuit 31, an equalizer 32, a PLL circuit 33 and a PRML circuit 34. As for the replay RF signals, replay data, as an RLL (1-7) code string, is obtained by data detection employing PR (1,2,1) ML and viterbi decoding, in the RLL (1-7) PP demodulating unit 35. On this RLL (1-7) code string, RLL (1-7) demodulation processing is carried out. The resulting data is corrected for errors and deinterleaved in the RS-LDC decoder 36.

In this case, the second magneto-optical disc B the third magneto-optical disc side of the selector 29 is selected, such that the demodulated data is output as replay data from the disc 90 to the data buffer 30. The demodulated data is then supplied to a memory transfer controller 12, shown in FIG. 12.

The tracking error signals TE and the focusing error signals FE, output from the RF amplifier 24, are supplied to a servo circuit 37, while the groove information is supplied to an ADIP decoder 38.

The ADIP decoder 38 limits the bandwidth of the groove information by a band-pass filter to extract wobble components and subsequently effectuates FM modulation and bi-phase demodulation to extract the ADIP address. If the disc is the first magneto-optical disc or the second magneto-optical disc, the ADIP information as the absolute information on the disc is supplied to a driving controller 41 through a MD address decoder 39, whereas, if the disc is the third magneto-optical disc, the ADIP information is supplied to the driving controller 41 through a third magneto-optical disc address decoder 40.

The driving controller 41 executes preset control processing based on each ADIP address. The groove information is returned to the servo circuit 37 for spindle servo control.

The driving controller 41 is provided with the function of a D-flip-flop discriminating circuit making up the optical disc discriminating apparatus 220. The driving controller 41 discriminates the sort of the magneto-optical disc based on the result of discrimination by the D-flipflop discriminating circuit 224.

Based on error signals, obtained on integrating the phase error between the groove information and the replay clocks (PLL-based clocks at the time of decoding), the servo circuit 37 generates spindle error signals for CLV servo control and for ZCAV servo control.

Based on the spindle error signals, tracking and focusing error signals, supplied form the RF amplifier 24, or track jump command or accessing command, from the driving controller 41, the servo circuit 37 generates various servo control signals, such as tracking control signals, focusing control signals, sled control signals or spindle control signals, and outputs these servo control signals to a motor driver 42. That is, the servo circuit 37 performs phase compensation processing, gain processing or target value setting processing, as needed, on servo error signals or commands, to generate various servo control signals.

Based on the servo control signal, supplied from the servo circuit 37, the motor driver 42 generates preset servo driving signals. These servo control signals prove a sled motor driving signals (two driving signals, namely the signals for the focusing direction and those for the tracking direction) actuating the biaxial mechanism, a sled motor driving signal, driving the sled mechanism, and a spindle motor driving signal, driving the spindle motor 21. By these servo driving signals, the focusing control and tracking control for the disc 90 and the CAV or ZCAV control for the spindle motor 21 is exercised.

In discriminating the optical disc, the optical disc discriminating apparatus 220 controls the servo circuit 37 and the motor driver 42, by the driving controller 41, to turn on the focusing of the laser light by the objective lens of the optical head 22. The tracking servo is not applied. The sled servo is such as to cause the optical head 22 to be moved from the inner rim towards the outer rim at a certain velocity.

In recording on the disc 90, high density data is supplied from a memory transfer controller 12, shown in FIG. 12, or usual ATRAC compressed data is supplied from an audio processing unit 19.

In recording on the first magneto-optical disc, the selector 43 is connected to a third magneto-optical disc side, such that an ACIRC encoder 44 and an EFM modulating unit 45 are in operation. When the input is an audio signal, compressed data from an audio processing unit 19 is interleaved and added by an error correction code by the ACIRC encoder 44 so as to be then EFM modulated by the EFM modulating unit 45. The EFM modulated data are supplied via selector 43 to a magnetic head driver 46 which then causes the magnetic head 23 to apply a magnetic field corresponding to the EFM modulated data to the disc 90 to record modulated data.

In recording on the second and the third magneto-optical disc, the selector 43 is connected to the second magneto-optical disc B the third magneto-optical disc side, such that an RS-LDC encoder 47 and the RLL (1-7) PP modulating unit 48 are in operation. It is noted that high density data sent from a memory transfer controller 12 is interleaved and added by an error correction code of the RS-LDC system, in the RS-LDC encoder 47, and RLL (1-7) modulated by the RLL (1-7) PP modulating unit 48.

The data for recording, modulated into an RLL (1-7) codestring, is supplied via selector 43 to the magnetic head driver 46, which then causes the magnetic head 23 to apply a magnetic field corresponding to the modulated data to the disc 90 to record the data.

A laser driver/APC 49, which causes a laser diode to emit laser light in replay and in recording, described above, also effectuates so-called APC (automatic laser power control). Specifically, a detector for monitoring the laser power, not shown, is provided within the optical head 22, with a monitor signal thereof being fed back to the laser driver/APC 49. This laser driver/APC 49 compares the current laser power, obtained as a monitor signal, to a preset laser power, to find an error, and causes the error to be reflected in the laser driving signal, in order to manage control so that the laser power output from the laser diode will be stabilized at a setting value. It should be noted that the magnitudes of the laser power, in terms of the replay laser power and the recording laser power, are set in an internal register of the laser driver/APC 49 by the driving controller 41.

The driving controller 41 controls various component parts, based on commands from a system controller 18, such as to execute the above-mentioned various operations, including the accessing, various servo operations, data write or data readout operations. Meanwhile, various components parts surrounded by chain-dotted lines, shown in FIG. 13, may each be constructed by a one-chip circuit.

Thus, the medium driving unit 11, having the optical disc discriminating apparatus 220 enclosed therein, is able to discriminate the second and the third magneto-optical discs by signal processing so that the disc rotating driving system is able to execute the recording and/or reproducing processing for the respective magneto-optical discs as it automatically switches between the recording and/or reproducing processing for the respective magneto-optical discs.

Figure 14:
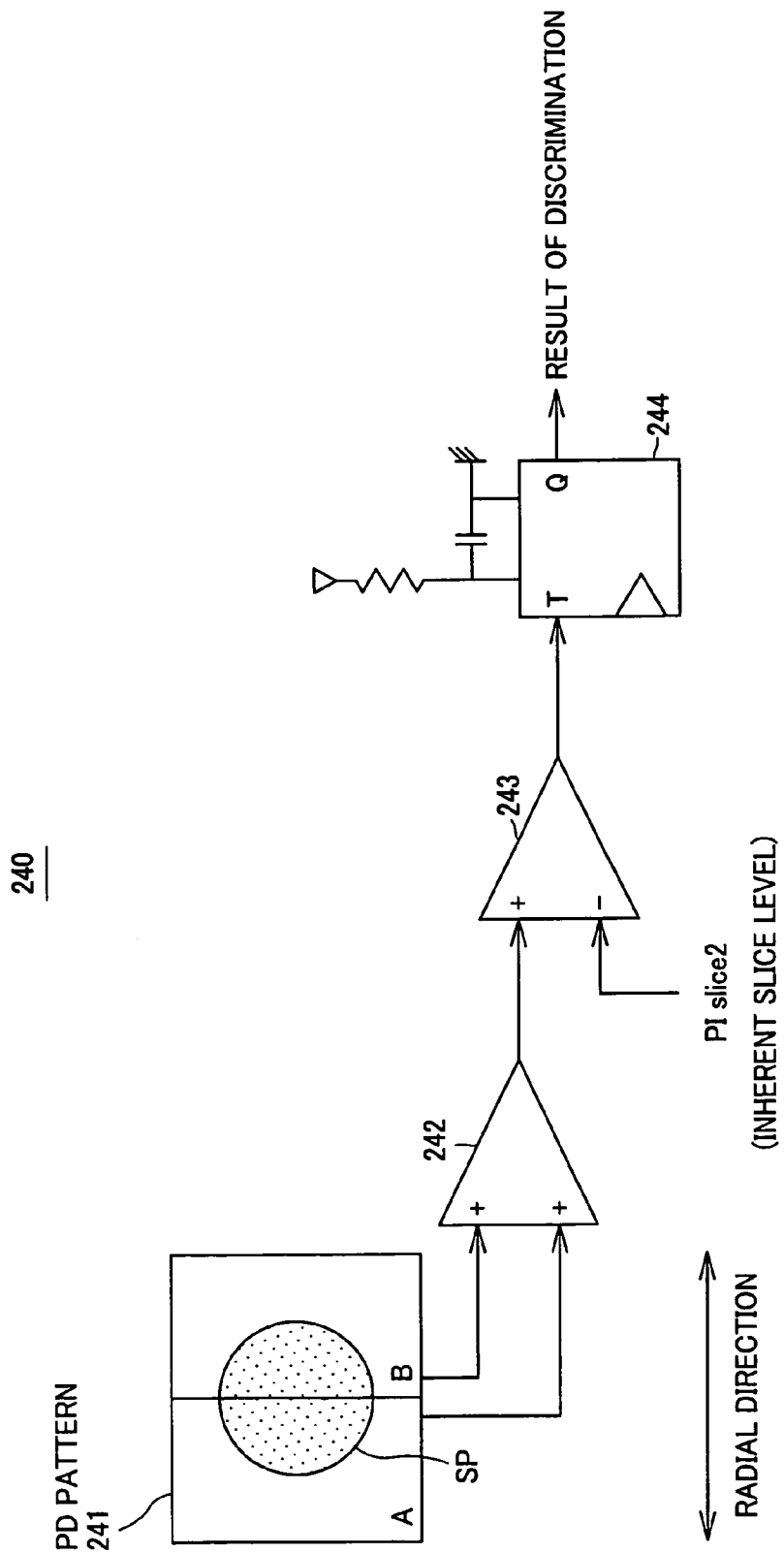
FIG. 14 shows another illustrative structure of the optical disc discriminating apparatus.

Meanwhile, as an embodiment of the present invention, an optical disc discriminating apparatus, shown in FIG. 14, may be named. This optical disc discriminating apparatus 240 discriminates the disc sorts of the second and the third magneto-optical discs which, having the recording system of recording data in a wobbled groove or in a wobbled land, an addressing system showing the addresses by the wobbled groove, and the outer profile, in common with each other, differ in the recording capacity.

Referring to FIG. 14, the optical disc discriminating apparatus 240 includes a pull-in signal calculating unit 242, a comparator 243 and a T-flip-flop discriminating circuit 244. The pull-in signal calculating unit focuses the light radiated to one of the magneto-optical discs, run in rotation by the spindle motor, through a converging lens, onto data recorded on the wobbled groove of the magneto-optical disc, to detect the total light volume signal PI of the mark, recorded on the wobbled groove, from the light reflected from the wobbled groove on which has been focused the light. The comparator outputs a result of comparison which is based on an inherent slice level PIslice2 for the pull-in signal PI as detected by the pull-in signal calculating unit 242, while the pull-in signal calculating unit discriminates the sort of the respective magneto-optical disc responsive to the result of comparison by the comparator 243.

The detailed structure and operation of the optical disc discriminating apparatus 240 is hereinafter explained.

The optical disc discriminating apparatus 240 is again enclosed in the medium driving unit 11 shown in FIG. 13. In particular, the main component parts of the optical disc discriminating apparatus are provided in a distributed fashion in the optical head 22, RF amplifier and in the driving controller 41 of the medium driving unit 11.

The optical disc discriminating apparatus 240 is again moved in such a state in which the laser light is focused-on by the objective lens provided in the optical head 22. The tracking servo is not applied.

It is noted that detracking components, superposed in this state on the PI signals, differ between the third magneto-optical disc and the second magneto-optical disc. Thus, after focusing servo pull-in, the optical disc discriminating apparatus 240 slices the PI component in the setting on the second magneto-optical disc. At this time, pulse signals are output from the second magneto-optical disc, while no pulse signals are output from the third magneto-optical disc. Based on this difference, the second and the third magneto-optical discs may be distinguished from each other.

First, the light receiving signals, detected by a photodetector PD 241, housed within the optical head 22, are routed to the pull-in signal calculating unit 242.

The pull-in signal calculating unit 242 sends the total light volume signal (A+B), as the sum signal of the light receiving signals A and B, as the pull-in signal PI to the comparator 243 as binary coding means.

The comparator 243 compares the push-pull signal PI to the slice level PIslice2 to route the result of comparison Comp out to the T-flipflop discriminating circuit 244. The T-flipflop discriminating circuit 244 is responsive to the presence or absence of the pulse of the result of comparison Comp out from the comparator 243 to discriminate the second and the third magneto-optical discs from each other.

Figure 15:
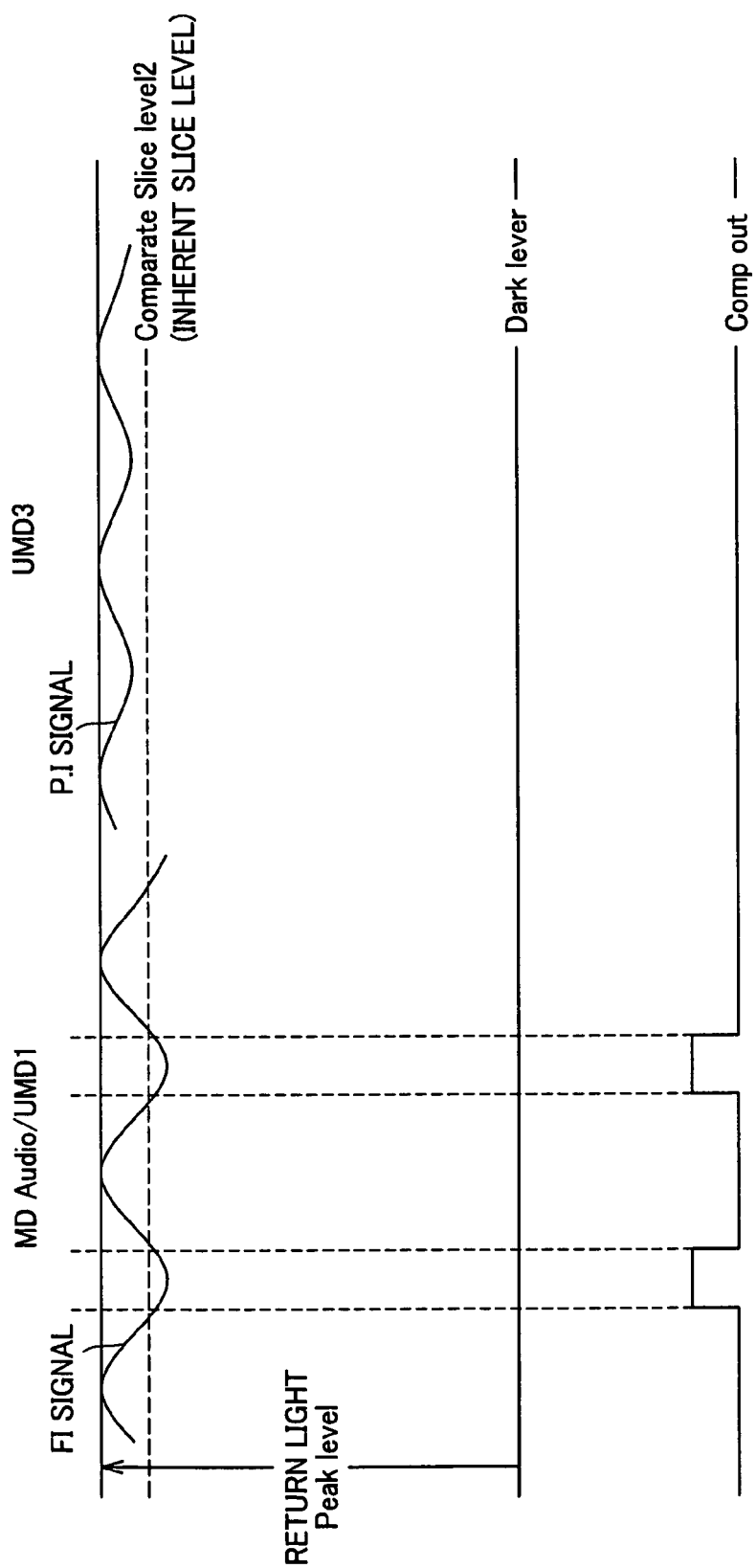
FIG. 15 shows the signal waveform in various portions of the optical disc discriminating apparatus shown in FIG. 14.

FIG. 15 shows respective signal waveforms in the respective parts of the optical disc discriminating apparatus 240. The PI signal of the second magneto-optical disc, inclusive of the first magneto-optical disc, has a large amplitude from the peak level to the bottom level, such that, when the signal is sliced based on an inherent slice level, there are produced pulses. If conversely an attempt is made to slice the PI signal of the third magneto-optical disc, using the same slice level, this PI signal cannot be sliced, because the PI signal has a small amplitude up to the bottom level from the peak level, and hence no pulses are generated.

It should be noted that the inherent slice level needs to be set so that the inherent slice level PIslice2, which is of the single sort, permits slicing of the PI signal of he second magneto-optical disc without permitting slicing of the PI signal of the third magneto-optical disc. The inherent slice level may be determined by the return light corresponding to the initial rated output.

The T-flipflop discriminating circuit 244 adjusts the time constant of a monomultivibrator by R and C and outputs the result of discrimination of the second and the third magneto-optical discs, inclusive of the first magneto-optical disc, from the output of the comparator 243.

This optical disc discriminating apparatus 240 is enclosed in the medium driving unit 11 shown in FIG. 13. In this case, the pull-in signal calculating unit 242 and the comparator 243 are provided in the RF amplifier 24. The function of the driving controller 41 is provided in the RF amplifier 24. The function of the T-flipflop discriminating circuit 244 is to control the recording unit, reproducing unit, servo unit and a motor driving unit 42 to record and/or reproduce the respective magneto-optical discs in a manner suited to the respective discs.

Figure 16:
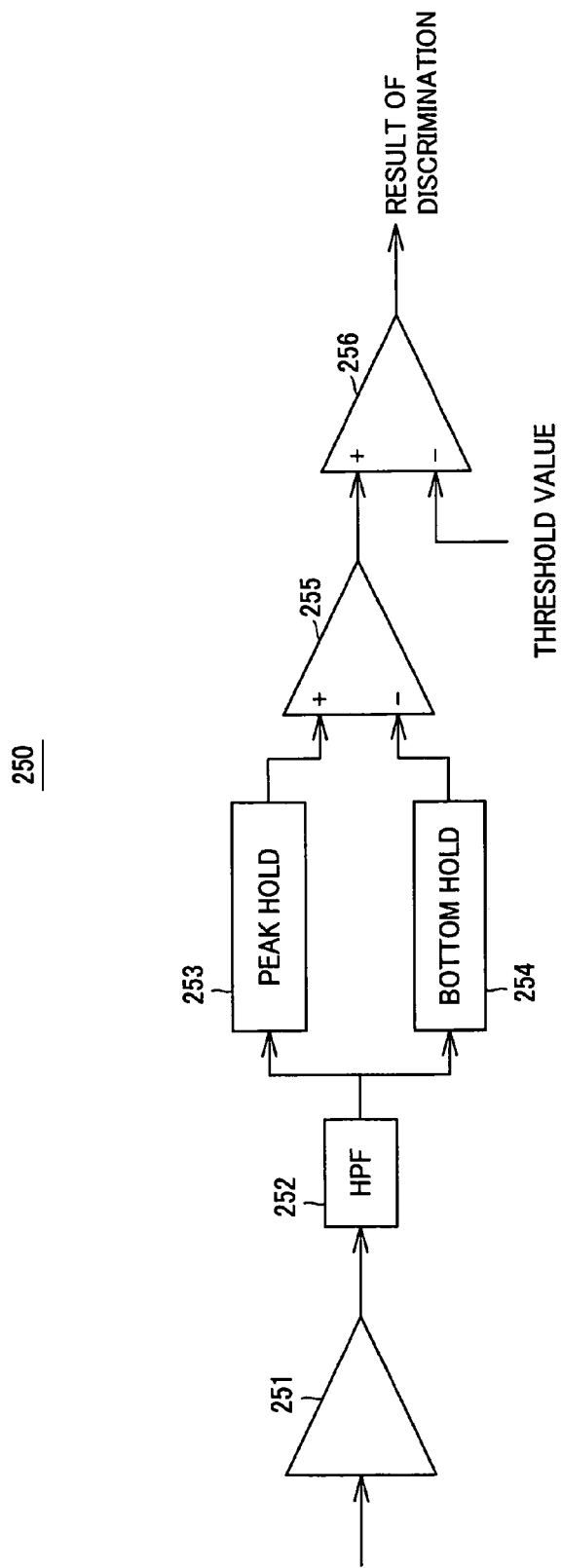
FIG. 16 is a block diagram showing another illustrative structure of the optical disc discriminating apparatus.

A further modified embodiment of the present invention is an optical disc discriminating apparatus 250 shown in FIG. 16. This optical disc discriminating apparatus 250 discriminates the second and the third magneto-optical discs which, despite the fact that the recording system of recording data on the wobbled groove or land, addressing system indicating the address by the wobbled groove, and the outer shape, of the discs remain the same, differ from each other in recording capacities from each other.

This optical disc discriminating apparatus 250 discriminates the disc sorts of plural different magneto-optical discs which, while having the recording system of recording data on the wobbled groove or land, addressing system indicating the address by the wobbled groove, and the outer shape, in common with each other, differ in recording capacity from each other, as shown in FIG. 16.

This optical disc discriminating apparatus 250 includes a slide motorB slide mechanism, a peak holding circuit 253, a bottom holding circuit 254, a differential calculating unit 255 and a discrimination circuit 256. The slide motorB slide mechanism is designed for causing movement of the optical head provided with a converging lens to a preset area of the optical disc after focusing the light being converged by the converging lens on the optical disc run in rotation by the spindle motor. The peak holding circuit is designed for holding the peak level of the high frequency signal detected from the optical head moved to a preset position of the magneto-optical disc by the slide motorB slide mechanism. The bottom holding circuit 254 holds the bottom level of the high frequency signal detected from the optical head moved to a preset position of the magneto-optical disc by the slide motorBslide mechanism. The differential calculating unit 255 detects the difference between the peak level held by the peak holding circuit 253 and the bottom level held by the bottom holding circuit 254, while the discrimination circuit 256 compares the magnitude of the difference as detected by the differential calculating unit 255 to the magnitude of a threshold value to discriminate the disc sort of the optical disc.

The principle of discrimination of the magneto-optical disc by the optical disc discriminating apparatus 250 is as follows: In the third magneto-optical disc, recording on the conventional PTOC area is not by pits but in accordance with the wobble groove system. Thus, in order to discriminate whether or not the magneto-optical disc is the second magneto-optical disc, the optical head is moved to the PTOC area, after pull-in of the focusing servo, to check signals obtained on peak- and bottom-holding the RF signal. When the disc is the second magneto-optical disc, the amplitude of the RF signals can be monitored even though the tracking servo is not applied. Thus, the amplitude of the RF signals is compared to a certain threshold value. If the amplitude of the RF signals is larger to more than a certain extent, the disc may be determined to be a second magneto-optical disc, whereas, if the amplitude of the RF signals is smaller, the disc is determined to be a third magneto-optical disc.

Thus, the optical disc discriminating apparatus 250 amplifies the return light from the area where there is written the PTOC of the second magneto-optical disc, or the return light from an area of the third magneto-optical disc in register with the area of the second magneto-optical disc where the PTOC has been written, by an amplifier 251, and subsequently filters the light with a high-pass filter (HPF) 252 to extract the RF signals. The peak level and the bottom level of the RF signals are held by the peak holding circuit 253 and the bottom holding circuit 254, respectively. The difference between the peak and bottom levels is found by calculations by the differential calculating unit 255. The difference is compared to a preset threshold by the comparator 256 to output the result of the discrimination.

Figure 17:
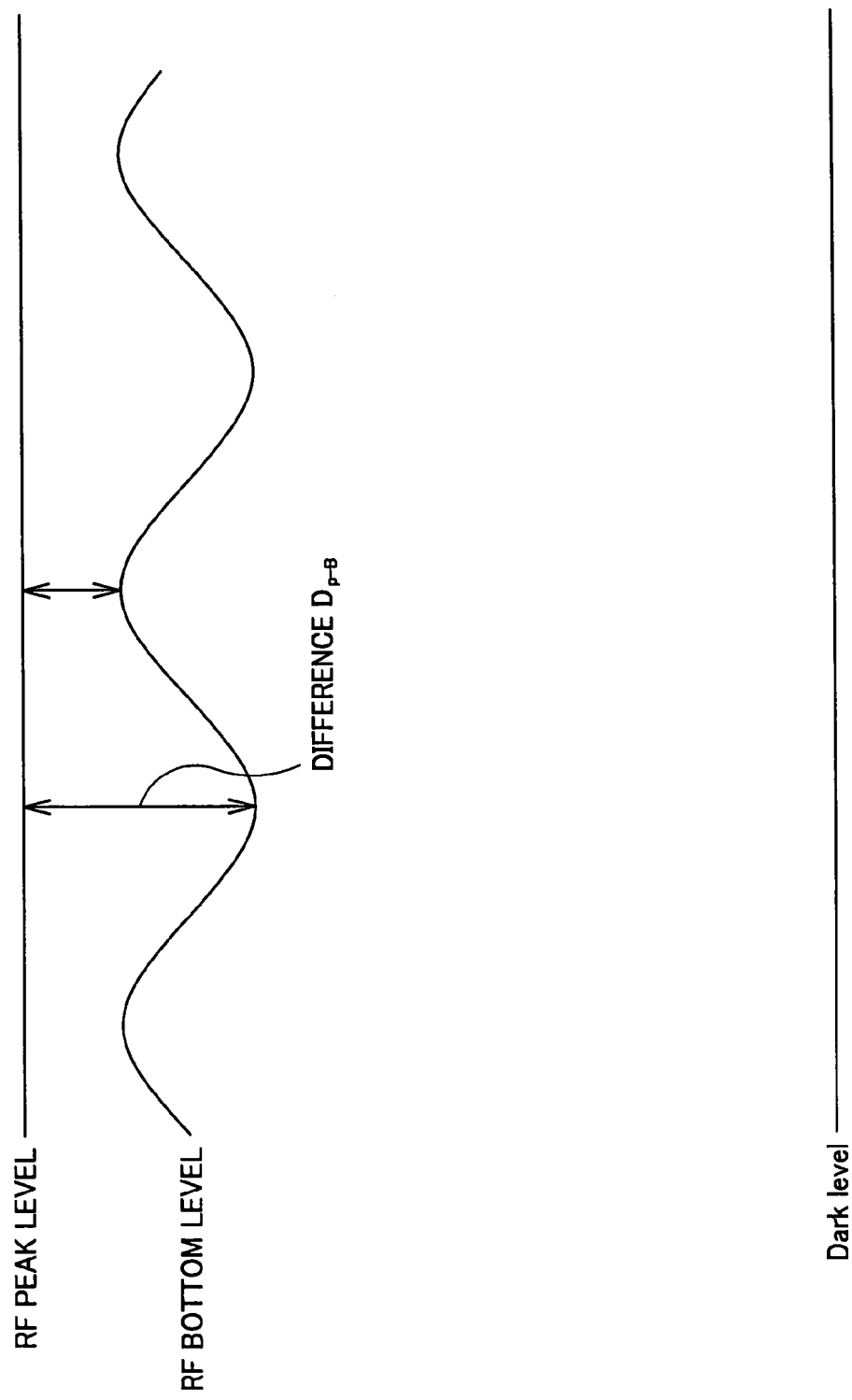
FIG. 17 shows the signal waveform in the in the next generation MD1 in various portions of the optical disc discriminating apparatus shown in FIG. 16.
Figure 18:
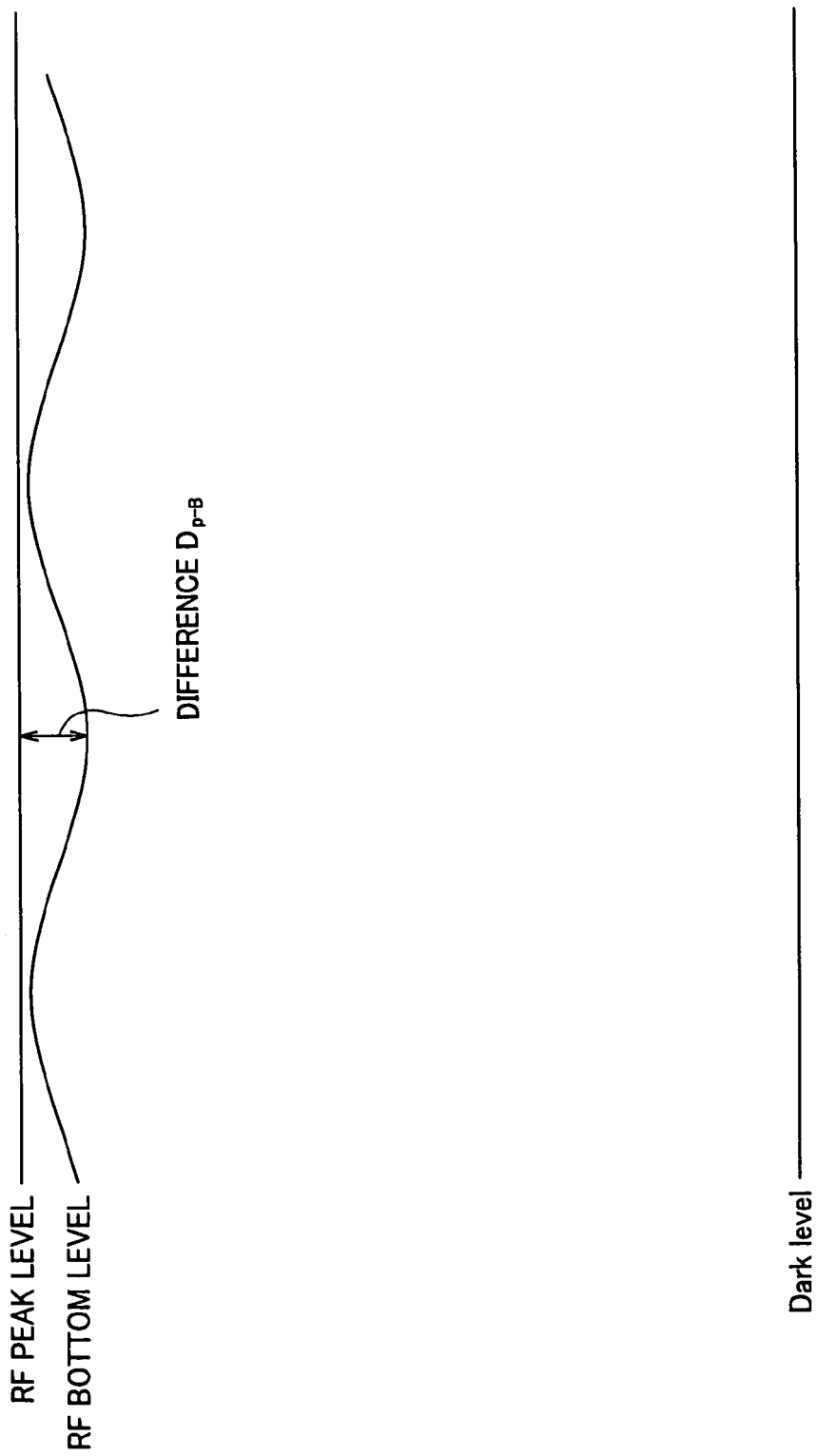
FIG. 18 shows the signal waveform in the next generation MD2 in various portions of the optical disc discriminating apparatus shown in FIG. 16.

FIG. 17 shows the signal waveform in respective portions of the optical disc discriminating apparatus 250. A large differential value DP–B is calculated from the peak level and the bottom level of the RF signals, held by the peak holding circuit 253 and by the bottom holding circuit 254, from the return light to the second magneto-optical disc, respectively.

A small differential value DP–B s calculated from the peak level and the bottom level of the RF signals, held by the peak holding circuit 253 and by the bottom holding circuit 254, from the return light to the second magneto-optical disc, respectively.

The large differential value DP–B and the small differential value DP-B are then compared to a preset threshold value by the comparator to determine whether the disc is the second magneto-optical disc or the third magneto-optical disc.

The present optical disc discriminating apparatus 250 is again enclosed in the medium driving unit 11 shown in FIG. 13. Based on the above results of discrimination, the driving controller 41 controls the recording unit, reproducing unit, servo unit and the motor driving unit 42 to carry out the recording and/or reproduction suited to the magneto-optical discs.

The optical disc discriminating apparatus 220, 240 and 250, explained in the foregoing, discriminate the disc sort in the focusing-on state. In further modifications of the optical disc discriminating apparatus, the optical disc may be discriminated in the tracking-on state. This optical disc discriminating apparatus discriminates the first and third magneto-optical discs from each other.

As the first further modification, an optical disc discriminating apparatus detects the ADIP frequency difference to discriminate the first and third magneto-optical discs from each other. The principle of this first specified embodiment is as follows: The first magneto-optical disc has the linear velocity of the ADIP frequency of 1.2 [m/sec], while having the reference frequency of the ADIP of 22.05 [kHz]. On the other hand, the third magneto-optical disc has the linear velocity of the ADIP frequency of 2.0 [m/sec], while having the reference frequency of the ADIP of 88.2 [kHz]. Since the operation is based on CLV, the angular velocity of the first magneto-optical disc is 12 [Hz] to 5 [Hz], while that of the third magneto-optical disc is 20 [Hz] to 10 [Hz]. If, when the number of revolutions of the disc under a focusing-on state is 10 [Hz], the frequency of ADIP is measured, it is 88.2 [kHz] to 44.1 [kHz] and 44.1 [kHz] to 22.05 [kHz] for the third magneto-optical disc and for first magneto-optical disc, respectively.

With the present optical disc discriminating apparatus, discrimination in an area with the overlapping ADIP frequency may be avoided by performing the discrimination operations as the optical head 22 is thrust against the innermost or outermost rim of the disc. Or, the optical head may be swung towards the inner rim or towards the outer rim in the overlapping area of the ADIP frequency.

Thus, with the optical disc discriminating apparatus of the first further modification, it is possible to discriminate the first and third magneto-optical discs from each other. Moreover, if the present optical disc discriminating apparatus is enclosed in the medium driving unit 11, the medium driving unit is able to discriminate the first and third magneto-optical discs from each other by signal processing and to cause the driving controller 41 to control the recording unit, reproducing unit, servo unit and the motor driving unit 42, based on the result of discrimination, to execute recording and/or reproduction suited to the respective magneto-optical discs.

A second further modification of the optical disc discriminating apparatus which discriminates the optical disc based on address readability is now explained only briefly. With this optical disc discriminating apparatus, the optical disc discriminating apparatus is built in the medium driving unit 11 and, in this state, the tracking servo is turned on, and the address is read. The optical disc is discriminated in dependence upon the type of the decoder which could be read.

The above-described optical disc discriminating apparatus are not only separately enclosed in the medium driving unit 11, but also may be enclosed in combination therein. For example, if a disc has not been discriminated by the optical disc discriminating apparatus 220, it may be discriminated by the optical disc discriminating apparatus 240 or by the optical disc discriminating apparatus 250. Or, the optical disc may be discriminated by majority decision of the results obtained by plural optical disc discriminating apparatus. For example, a given disc may be determined to be a third magneto-optical disc because the same results have been obtained in favor of the third magneto-optical disc by the optical disc discriminating apparatus 220, 250.

Figure 19:
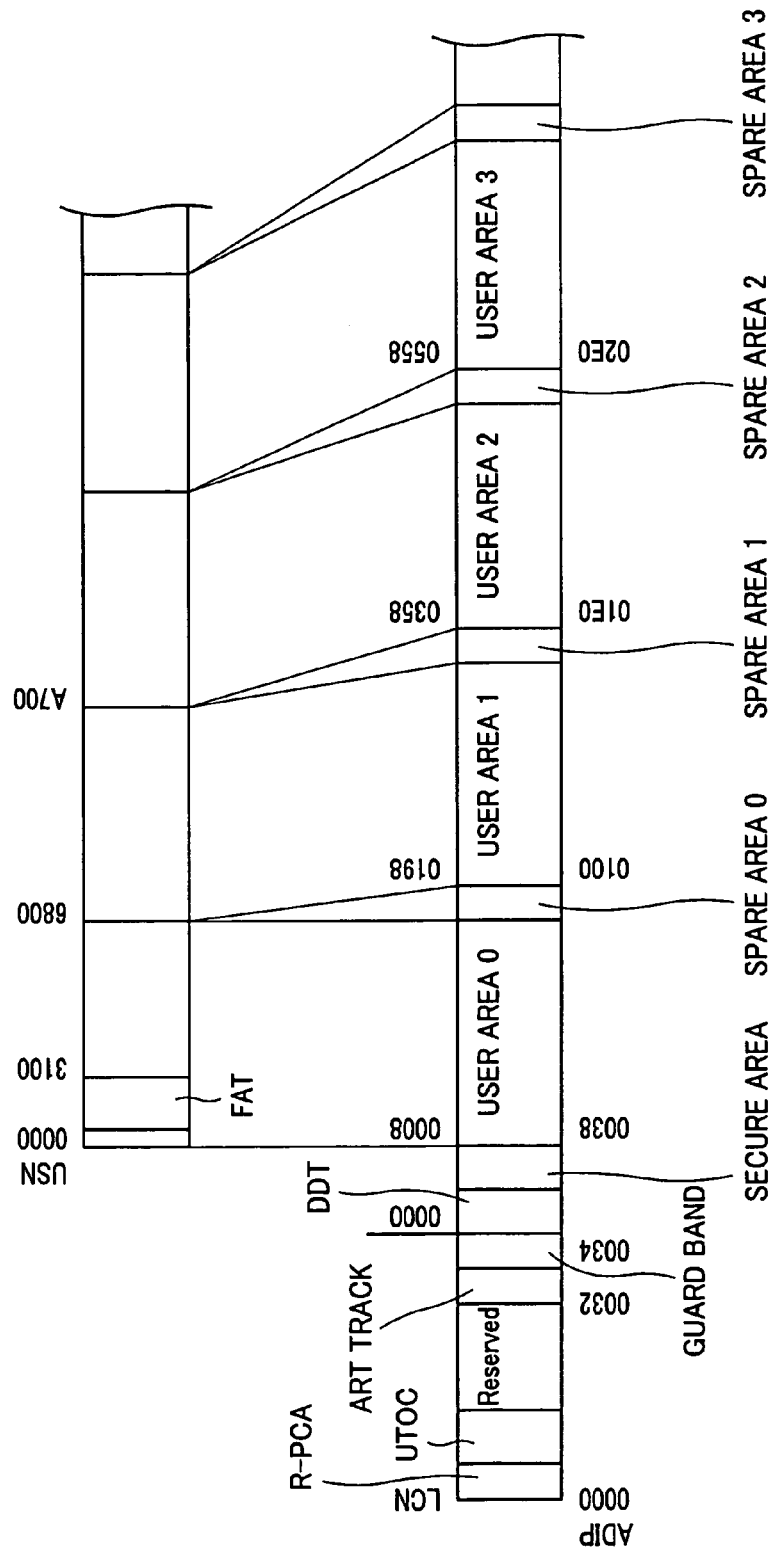
FIG. 19 shows a data management structure of the next generation MD1.
Figure 20:
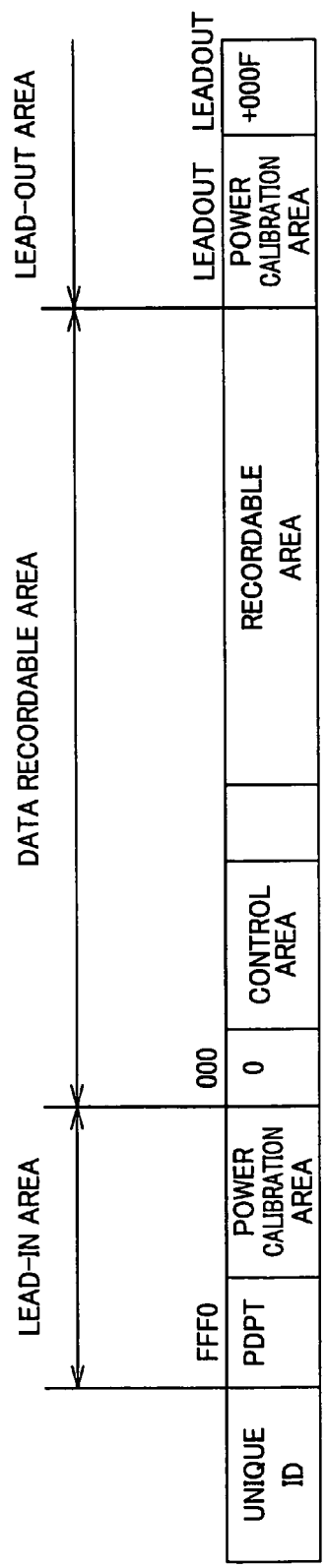
FIG. 20 shows a data management structure of the next generation MD2.

The disc management structure of the second magneto-optical disc and the third magneto-optical discs are now explained by referring to FIGS. 19 and 20.

FIGS. 19 and 20 show the data management structures of the second and the third magneto-optical discs, respectively.

Since the second magneto-optical disc is the same recording medium as the conventional Mini-Disc, as described above, the PTOC is recorded by non-rewritable embossed pits, such as those used in the first magneto-optical disc. In this PTOC, total disc capacity, the UTOC position in the UTOC area, the position of the power calibration, the start position and the end position of the data area (leadout position), for example, are recorded as the management information.

In ADIP addresses 0000 to 0002 of the second magneto-optical disc, there is provided a power calibration area (Rectangular Power Calibration Area) for adjusting the laser write output. In the next following ADIP addresses 0003 to 0005, there is recorded the UTOC including the management information rewritten in dependence on the recording and erasure of the tracks (audio track/data track). The UTOC supervises the start position and the end position of parts constituting the tracks and parts that make up the tracks. The UTOC also supervises the parts of the free area in the data area where tracks are not as yet recorded, that is the parts in the writable area. On the UTOC, the data for PC in their entirety are supervised as a sole track which is not destined for the MD audio data. Thus, if the audio data and the data track are co-recorded, it is possible to supervise the recording position of the data for PC divided into plural parts.

The UTOC data is recorded in a specified ADIP cluster in this UTOC area. The contents of the UTOC data are defined from one sector in the ADIP cluster to another. Specifically, the UTOC sector 0 supervises the parts in the track or the free area, while the UTOC sectors 1 and 4 supervise the text information associated with the sector. In the UTOC sector 2, there is written the information supervising the track recording date and time.

The UTOC sector 0 is a data area having data recorded therein, a non-recorded data area and a data area having the data management information recorded therein. For example, when recording data on a disc, the disc driving device finds out a non-recorded area on the disc, from the UTOC sector 0, to record data therein. In replay, the disc driving device determines the area where the recording track to be reproduced is recorded, from the UTOC sector 0, and accesses the area to perform the reproducing operation.

Meanwhile, in the second magneto-optical disc, the PTOC and the UTOC are recorded as data modulated in accordance with a system conforming to the conventional Mini-Disc system, herein data modulated in accordance with the EFM modulation system. Consequently, the second magneto-optical disc has an area where there is recorded data modulated in accordance with the EFM modulation system and an area where there is recorded data modulated in accordance with the RS-LDC and RLL (1-7) PP modulation system.

In an alert track stated in an ADIP address 0032, there is stored the information for alerting that, even though the second magneto-optical disc is inserted into the disc driving device of the first magneto-optical disc, this recording medium is not in meeting with the disc driving device of the first magneto-optical disc. This information may be speech data: [This disc is of a format that is not in keeping with this reproducing apparatus] or an alarm sound data. If the disc driving device is provided with a display, the information may be data for displaying such effect. This alert track is recorded in accordance with the EFM modulation system so that it may be read even with the disc driving device associated with the first magneto-optical disc.

In the ADIP address 0034, there is recorded a disc description table (DDT) indicating the disc information of the second magneto-optical disc. In the DDT, there are stated e.g. a format system, the total number of in-disc logical clusters, an inherent ID of the recording medium, the update information for the DDT and the defective cluster information.

Since high-density data, modulated in accordance with the RS-LDC and RLL (1-7) PP modulation system in the DDT area, a guard band area is provided between the alert track and the DDT.

To the most junior ADIP address where there is recorded the high density data modulated in accordance with the RLL (1-7) PP modulation system, that is to the leading address of the DDT, there is accorded the logical cluster number LCN which sets the address to 0000. One logical cluster, made up by 65,536 bytes, serves as the smallest read/write unit. Meanwhile, the ADIP addresses 0006 to 0031 are reserved.

In the following ADIP addresses 0036 to 0038, there is provided a secure area that may be opened on authentication. This secure area supervises the attributes, such as openability or unopenability of the respective clusters making up the data. In particular, e.g. the information for protecting the copyright and the information for checking data falsification are recorded. Other unopened information of various sorts may be recorded. The unopenable area may be accessed, only in a limited fashion, by a particularly permitted specified external equipment. The information for authenticating the external equipment that may have access is among the information recorded in the secure area.

From the ADIP address 0038, there are recorded a user area of an optional data length, that may be written or read freely, and a spare area, with a data length of 8. When arrayed in the increasing order of the LCN, the data recorded in the user area is partitioned into user sectors, with 2048 bytes as a unit, from the leading end. From the external equipment, such as PC, management is made by a FAT file system in accordance with user sector numbers with the leading user sector as 0000.

Referring to FIG. 20, the data management structure of the third magneto-optical disc is now explained. The third magneto-optical disc does not have a PTOC area. For this reason, the disc management information, such as the total capacity of the disc, position of the power calibration area, the start position of the data area or the end position of the data area (leadout position), is included in their entirety in the ADIP information and recorded as PDPT (PreFormat Disc Parameter Table). The data are modulated in accordance with the RS-LDC and RLL (1-7) PP modulation system with BIS and are recorded by the DWDD system.

In the lead-in area and in the lead-out area, there is provided a laser power calibration area (PCA). In the third magneto-optical disc, the LCN is accorded with the ADIP address next following the PCA as 0000.

The third magneto-optical disc includes a control area corresponding to the UTOC area of the second magneto-optical disc. FIG. 20 shows a unique ID area (UID) in which to record the information for copyright protection, the information for prohibiting data tampering and other unopened information. In actuality, this UID area is recorded in an area lying on the further inner side of the lead-in area in accordance with a recording system different from the usual DWDD system.

The files of the second and the third magneto-optical discs are supervised in accordance with the FAT file system. For example, each data track has a unique FAT file system. Or, a single FAT file system may be recorded across plural data tracks.

The relationship between the ADIP sector structure and the data block of the second and the third magneto-optical disc is now explained with reference to FIG. 21. In the conventional system concerning the first magneto-optical disc, a cluster/sector structure associated with the physical address recorded as the ADIP is used. In the present specified embodiment, a cluster derived from the ADIP address is termed an [ADIP cluster] for explanation sake, while the cluster derived from the address in the second and the third magneto-optical discs are termed a [recording block] or a [next generation MD cluster].

Figure 21:
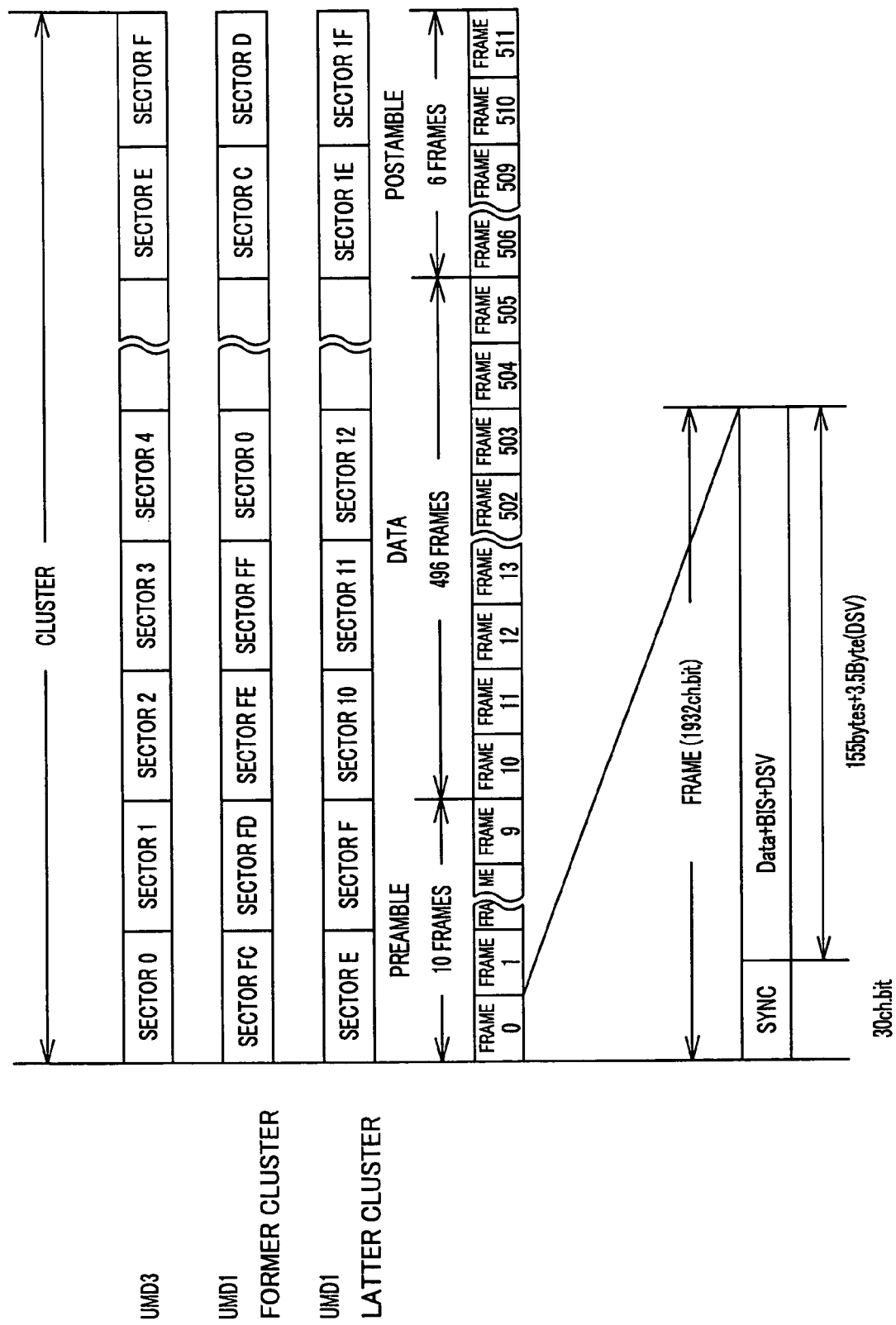
FIG. 21 illustrates the relationship between the ADIP sector structure and the data block of the next generation MD1 and the next generation MD2.

In the second and the third magneto-optical discs, a data track is handled as a data stream recorded by a succession of clusters, as minimum address units, as shown in FIG. 21, such that one recording block (first generation MD cluster) is formed by 16 sectors or one-half ADIP cluster, as shown in FIG. 21.

The data structure of one recording block (first generation MD cluster) shown in FIG. 21 is made up by 512 frames, namely 10 frames of a preamble, 6 frames of a post-amble, and 496 frames of a data section. Each frame in this recording block is made up by a synchronization signal area, data, BIS and DSV.

Each set of 31 frames, obtained on dividing 496 frames, in which there are recorded significant data, of the 512 frames, making up one recording block, into 16 equal portions, is termed an address unit. The number of this address unit is termed an address unit number (AUN). This AUN, which is a number accorded to the totality of the address units, is used for address management of recording signals.

In recording high density data, modulated in accordance with the (1-7) PP modulation system, on a first magneto-optical disc having a physical cluster/sector structure, described in the ADIP such as the second magneto-optical disc, a problem may be presented in which the ADIP address, inherently recorded on the disc, and an address of an actually recorded data block, are not coincident with each other. In random accessing, which is carried out with the ADIP address as a reference, recorded data can be read out even when access is made to a vicinity of a location where there is written desired data. However, in writing data, it is necessary to access to a correct location in order not to overwrite and erase already recorded data. It is therefor crucial to correctly grasp the access position from the next generation MD cluster/next generation MD sector associated with the ADIP address.

Thus, with the second magneto-optical, a high density data cluster is grasped by a data unit obtained on conversion of an ADIP address, recorded as a wobble on the medium surface, in accordance with a preset rule. In this case, an integer number multiples of the ADIP sector is to be a high density data cluster. If, based on this concept, the next generation MD cluster is stated in one ADIP cluster, recorded on a first magneto-optical disc, each next generation MD cluster is formed in one-half ADIP cluster domain.

Thus, in the second magneto-optical disc, two of the above-mentioned next generation MD2 clusters are associated with one ADIP cluster as being a minimum recording unit (recording block).

In the third magneto-optical disc, one cluster is handled as one recording block.

In the present specified embodiment, a 2048 byte based data block, supplied from a host application, is one logical data sector (LDS), and a set of 32 logical data sectors, recorded in the same recording block, is a logical data cluster (LDC).

With the above-described data structure, the data of the second and the third magneto-optical discs can be recorded at an optimum timing on a recording medium, when the UMD data is to be recorded at an optional location on the recording medium. Since an integer number of next generation MD clusters is contained in the ADIP cluster as ADIP address unit, the rule of address conversion from the ADIP cluster address to the UMD data cluster address is simplified to simplify the circuitry for conversion or the software configuration.

Although FIG. 21 shows an embodiment in which two next generation MD clusters are associated with one ADIP cluster, three or more next generation MD clusters may also be arranged on one ADIP cluster. It should be noted that the present invention is not limited to a structure in which one next generation MD cluster is made up by 16 ADIP sectors, such that the number of the ADIP sectors that go to make up the next generation MD cluster may be set depending on the difference in the data recording density of the EFM modulation system and that of the RLL (1-7) PP modulation system, the number of sectors that go to make up the next generation MD cluster or the size of one sector.

The data structure of the ADIP is hereinafter explained. FIG. 22A shows the data structure of the ADIP of the third magneto-optical disc, whilst FIG. 22B shows the data structure of ADIP of the second magneto-optical disc.

In the second magneto-optical disc, there are stated a synchronization signal, the information on the cluster H information and the cluster L information, indicating e.g. cluster numbers in a disc, and the sector information (sector) including the sector number in the cluster. The synchronization signal is stated with four bits, the cluster H is stated with the upper eight bits of the address information, the cluster L is stated with lower eight bits of the address information, and the sector information is stated with four bits. The CRC is appended as trailing end 14 bits. Thus, a sum total of 42 bits are recorded in a header of each ADIP sector.

In the third magneto-optical disc, there are recorded four bits of synchronization signal data, four bits of the cluster H information, eight bits of the cluster M information, four bits of the cluster L information and four bits of the sector L information. BCH parity is appended as 18 trailing end bits. In the third magneto-optical disc, 42 bits of the ADIP signals are recorded in a header of each ADIP sector.

In the ADIP data structure, the structures of the cluster H information, cluster M information and the cluster L information may be determined arbitrarily. Other supplementary information can also be stated in this structure. For example, in the ADIP signal of the third magneto-optical disc, shown in FIG. 23, it is possible to state the cluster information as the cluster H of the upper eight bits and the cluster L of the lower eight bits, and to state the disc control information in lieu of the cluster L represented by the lower eight bits. The disc control information may be enumerated by e.g. a servo signal correction value, an upper limit value of the replay laser power, correction coefficients for the line speed of the replay laser power, an upper limit value of the recording laser power, correction coefficients for the line speed of the recording laser power, recording magnetic sensitivity, magneticBlaser pulse phase difference and the parity.

The reproducing and recording processing, performed by the disc driving device 10 (FIG. 12) on the second or third magneto-optical disc, discriminated by the optical disc discriminating apparatus, is now explained in detail.

In accessing to a data area, a command for recording and/or reproducing data in terms of a [logical sector] (referred to below as FAT sector) as a unit is issued from the external PC 100 through the USB interface 16 to the system controller 18 of the disc driving device 10. To the PC 100, it appears as if the data cluster is divided in terms of 2048 bytes as a unit and is supervised in accordance with the FAT file system in the increasing order of the USN, as shown in FIG. 19. On the other hand, the minimum rewrite unit of the data track in the disc 90 is the next generation MD cluster, having the size of 65,536 bytes, and the LCN is given to this next generation MD cluster.

The size of the data sector, referenced by the FAT, is smaller than that of the next generation MD cluster. It is therefore necessary for the disc driving device 10 to convert the user sector, referenced by the FAT, into a physical ADIP address, and to convert read/write, in terms of the data sector, referenced by the FAT, into read/write in terms of the next generation MD cluster based read and write, using the buffer memory 13.

Figure 24:
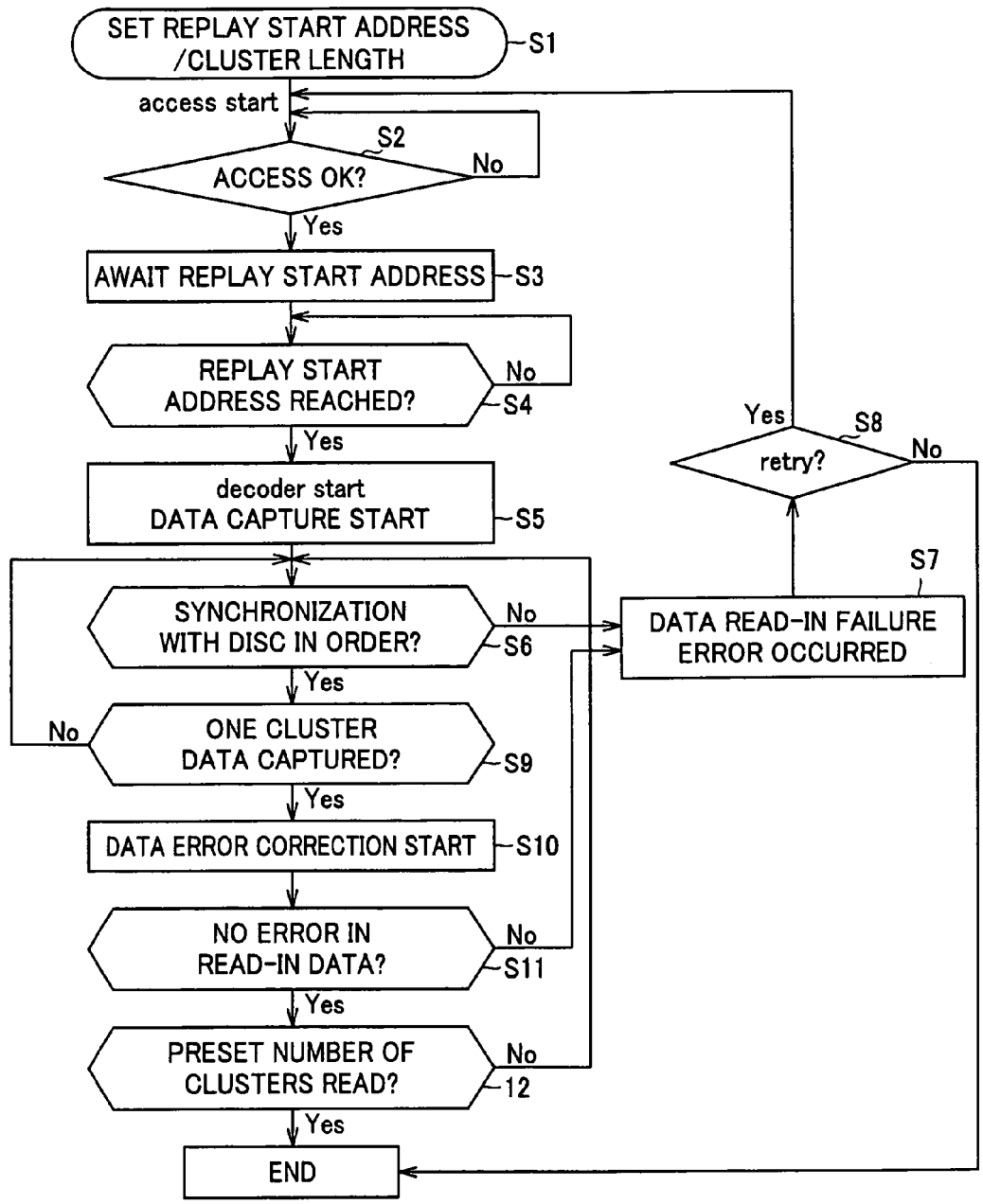
FIG. 24 is a flowchart showing the processing in a system controller in a disc drive device in case a request for reading out a given FAT sector is made from a PC.

FIG. 24 shows the processing in the system controller 18 in the disc driving device 10 in case a request for readout of a certain FAT sector from the PC 100.

On receipt of a readout command for reading out the FAT sector #n from the PC 100 via USB interface 16, the system controller 18 performs the processing of finding the next generation MD cluster number containing the FAT sector of the specified FAT sector number #n.

The provisional next generation MD cluster number u0 is determined. Since the size of the next generation MD cluster is 65536 bytes and the size of the FAT sector is 2048 bytes, there are 32 FAT sectors in the first generation MD cluster. Thus, the FAT sector number (n) divided by an integer 32, with the remainder being truncated (u0), represents the provisional next generation MD cluster number.

The system controller then references the disc information, read-in from the disc 90 into the auxiliary memory 14, to find the number of the next generation MD cluster ux other than the clusters for data recording. This number is the number of the next generation MD clusters of a secure area.

Among the next generation MD clusters within the data track, there is a cluster that is not laid open as being a data recordable/reproducible area. Thus, the number of clusters not laid open ux is found based on the disc information previously read into the auxiliary memory. The number of clusters not laid open ux is then summed to the cluster number u0 of the next generation MD cluster number to give a sum u which is to be the actual next generation MD cluster number #u.

When the next generation MD cluster number #u, including the FAT sector number #n, is found, the system controller 18 determines whether or not the next generation MD cluster of the cluster number #u has already been read out and stored in the cluster buffer memory 13. If the cluster has not been stored, it is read out from the disc 90.

The system controller 18 finds the ADIP address #a from the next generation MD cluster number #u as read out to read out the next generation MD cluster from the disc 90.

The next generation MD cluster may be recorded in plural parts on the disc 90. For this reason, these parts need be retrieved sequentially in order to find the actually recorded ADIP address. The number of the MD clusters of the next generation and the number of the leading next generation MD cluster px, recorded in the leading part of the data track, are found from the disc information read out in the auxiliary memory 14.

Since the start address/end address are recorded in the respective parts by the ADIP address, the number of the next generation MD clusters p and the leading next generation MD cluster px may be found from the disc information read out into the ADIP cluster address and the part length. It is then verified whether or not the next generation MD cluster of the targeted cluster number #u is included in this part. If the cluster is not included in the part, the next part is checked. This next part is that part which is specified by the link information of the part which has thus far been of interest. In this manner, the parts stated in the disc information are sequentially retrieved to determine the part containing the next generation MD cluster of interest.

When the part having recorded the next generation MD cluster of interest (#u) is found, the difference between the cluster number px of the next generation MD cluster recorded in the leading end of this part thus found and the cluster number #u of the next generation MD cluster of interest is found to find the offset from the leading end of the part to the next generation MD cluster (#u) of interest.

Since two next generation MD clusters are written in this case in one ADIP cluster, the offset may be converted into the ADIP address offset f by dividing the offset by 2 (f=(u−px)/2).

However, if a fractional number of 0.5 is obtained, writing is from the mid part of the cluster f. Ultimately, an offset f is added to a cluster address part in the start address of the part to find the ADIP address #a of the destination of recording in which to actually write the next generation MD cluster #u. The above corresponds to the processing of setting the replay start address and the cluster length in the step S1. It is here assumed that decision as to whether the medium is the first magneto-optical disc, the second magneto-optical disc or the third magneto-optical disc has already been finished by another particular technique.

When the ADIP address #a has been found, the system controller 18 commands the medium driving unit 11 to access to the ADIP address #a. The medium driving unit 11 then accesses the ADIP address #a, under control by the driving controller 41.

In a step S2, the system controller 18 awaits the access completion. On access completion, the system controller 18 awaits the optical head 22 reaching the targeted replay start address. If, in a step S4, the system controller has ascertained that the replay start address has been reached, the system controller commands the medium driving unit 11 to start reading out one cluster of data of the next generation MD cluster.

Responsive thereto, the medium driving unit 11 commences to read out data from the disc 90, under control by the driving controller 41. The read-out data are output by a replay system of the optical head 22, RF amplifier 24, RLL (1-7) PP demodulating unit 35 and the RS-LDC decoder 36 and thence routed to the memory transfer controller 12.

In a step S6, the system controller 18 verifies whether or not synchronization with respect to the disc 90 has been in good order. If the synchronization with respect to the disc 90 is not in good order, a signal indicating the purport of occurrence of a data readout error is generated in a step S7. If, in a step S8, it is determined that readout is to be performed again, the step as from step S2 is repeated.

When one cluster data has been acquired, the system controller 18 in a step S10 commences correcting the acquired data for errors. If, in a step S11, there is an error in the acquired data, the system controller 18 reverts to a step S7 to generate a signal indicating that a data readout error has occurred. If there is no error in the acquired data, it is verified in a step S12 whether or not a preset cluster has been acquired. When the preset cluster has been acquired, the sequence of processing operations is terminated. The system controller 18 awaits the readout operation by the medium driving unit 11 to store data read out and supplied to the memory transfer controller 12 in the cluster buffer memory 13. When the preset cluster has not been acquired, the process as from the step S6 is repeated.

One cluster data of the next generation MD cluster, read into the cluster buffer memory 13, includes plural FAT sectors. Thus, from these FAT sectors, the storage location of data of the requested FAT sector is found and data of one FAT sector (2048 bytes) are sent out from the USB interface 15 to the external PC 100. Specifically, the system controller 18 finds, from the requested FAT sector number #n, a byte offset #b within the next generation MD cluster containing this sector. The system controller causes data for one FAT sector (2048 bytes), from the location of the byte offset #b in the cluster buffer memory 13, to transfer the so read-out data via USB interface 15 to the PC 100.

By the above processing, the next generation MD sector may be read out and transferred responsive to a readout request for one FAT sector from the PC 100.

Figure 25:
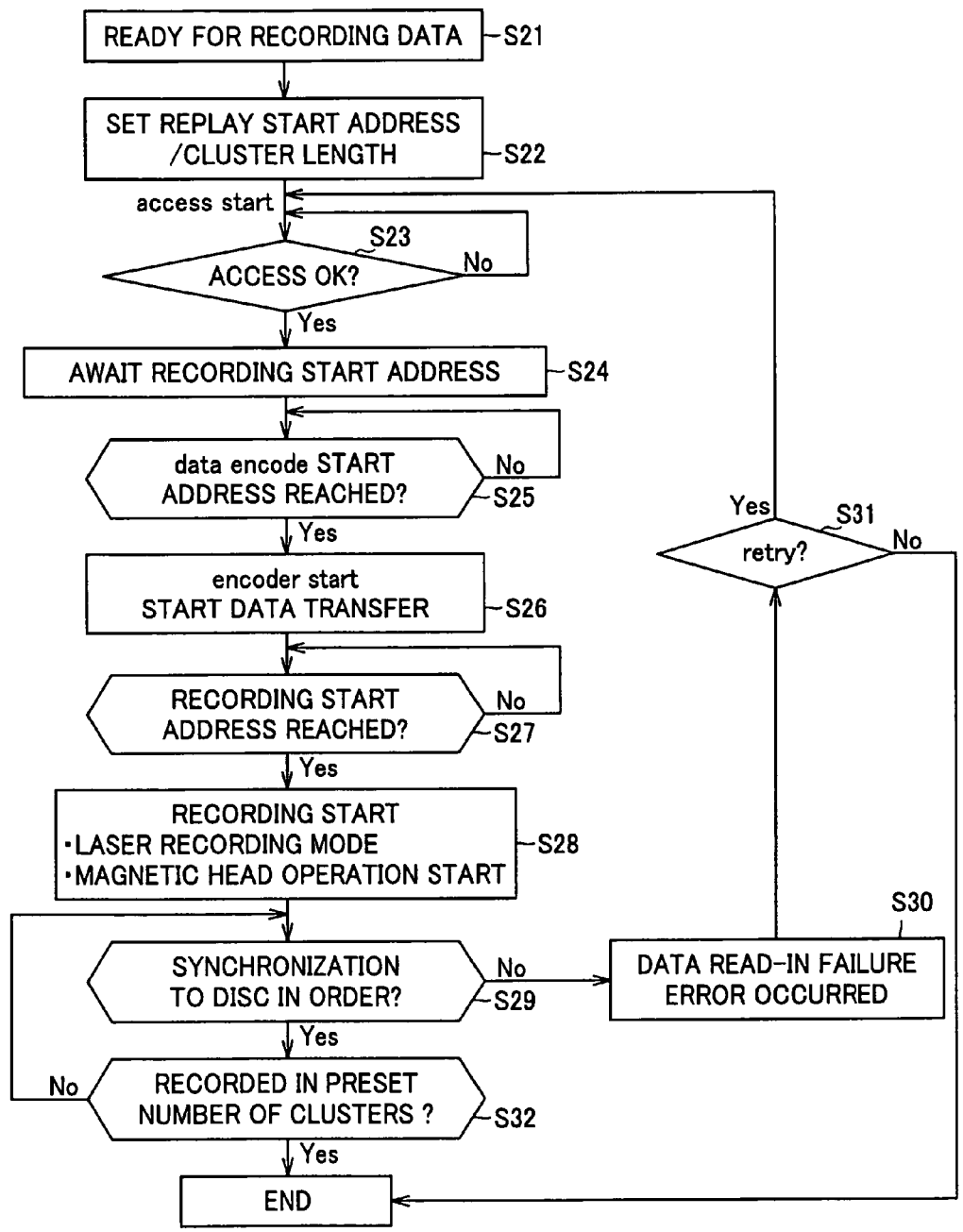
FIG. 25 is a flowchart showing the processing in a system controller in a disc drive device in case a request for reading out a given FAT sector is made from the PC.

Referring to FIG. 25, the processing by the system controller 18 in the disc driving device 10 in case a write request for a given FAT sector is made from the PC 100 is now explained.

On receipt of a write command for the FAT sector #n via USB interface 16 from the PC 100, the system controller 18 finds the next generation MD cluster number containing the FAT sector of the FAT sector number #n, specified as described above.

When the next generation MD cluster number #u, including the FAT sector number #n, is found, the system controller 18 verifies whether or not the next generation MD cluster of the cluster number #n thus found has already been read out from the disc 90 and stored in the cluster buffer memory 13. If the cluster has not been stored, the processing for reading out the next generation MD cluster of the cluster number #u is performed. That is, the system controller 18 commands the medium driving unit 11 to read out the next generation MD cluster of the cluster number #u to store the so read out next generation MD cluster in the cluster buffer memory 13.

Thus, from the FAT sector number #n, requested for writing, the system controller 18 finds the byte offset #b in the next generation MD cluster containing the sector. The system controller 18 then receives 2048 byte data, as write data for the FAT sector #n, transferred from the PC 100, via USB interface 15, and causes the data corresponding to one FAT sector data (2048 bytes) from the position of the byte offset #b in the cluster buffer memory 13.

In this manner, only the FAT sector (#n), specified by the PC 100, among the data of the next generation MD cluster (#u), stored in the cluster buffer memory 13, is in a rewritten state. The system controller 18 then prepares for writing the next generation MD cluster (#u), stored in the cluster buffer memory 13, on the disc 90. The above is the process in a step S21 for making preparations for the recording data. It is again assumed that decision as to the medium type has already been completed by another particular technique.

In the next step S22, the system controller 18 sets, from the number #u of the next generation MD cluster to be written, an ADIP address #a of the recording start position. When the ADIP address #a has been found, the system controller 18 commands the medium driving unit 11 to access to the ADIP address #a. This causes the medium driving unit 11 to access to the ADIP address #a, under control by the driving controller 41.

If it is ascertained in a step S23 that the access has come to a close, the system controller 18 waits until the optical head 22 reaches the replay start address of interest. If it is ascertained in a step S25 that the data encode address has been reached, the system controller 18 in a step S26 commands the memory transfer controller 12 to start transfer to the medium driving unit 11 of data of the next generation MD cluster (#u) stored in the cluster buffer memory 13.

When it is ascertained in a step S27 that a recording start address has been reached, the system controller 18 in a step S28 commands the medium driving unit 11 to start writing data of the next generation MD cluster on the disc 90. Responsive thereto, the medium driving unit 11 starts writing data on the disc 90, under control by the driving controller 41. That is, the data transferred from the memory transfer controller 12 is recorded by a recording system composed of the RS-LDC encoder 47, RLL (1-7) PP modulating unit 48, magnetic head driver 46, magnetic head 23 and the optical head 22.

The system controller 18 in a step S29 verifies whether or not synchronization with respect to the disc 90 is in good order. If synchronization with respect to the disc 90 is out of order, the system controller 18 in a step S30 generates a signal to the effect that a data readout error has occurred. If it is determined in a step S31 that readout is again executed, the process as from the step S2 is repeated.

When one cluster data has been acquired, the system controller 18 in a step S32 checks whether or not a preset cluster has been acquired. When a preset cluster has been acquired, the sequence of operations is terminated.

By the above-mentioned processing, writing the FAT sector data on the disc 90 responsive to the write request for one FAT sector from the PC 100 may be achieved. That is, the FAT sector based writing is executed as rewriting of the next generation MD cluster unit, insofar as the disc 90 is concerned.

Meanwhile, the above-described optical disc discriminating apparatus discriminates the sort of the second or third magneto-optical disc of the groove recording type, in which data has been recorded in the wobbled groove. However, it is also possible to discriminate different sorts of the optical disc of the land recording type in which data has been recorded in a land sandwiched between neighboring wobbled grooves.

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

With the optical disc discriminating apparatus and method according to the present invention, it is possible to discriminate the sorts of the optical discs in which the optical system and the outer shape are common but the UTOC recording system differs, such as the second and the third magneto-optical discs.

With the optical disc discriminating apparatus and method according to the present invention, it is also possible to discriminate the sort of the optical disc, loaded in position, by the optical disc discriminating apparatus and method, and subsequently to record and reproduce the information.

What is claimed is:

1. An optical disc discriminating apparatus for discriminating plural sorts of optical discs in which data are recorded in a groove presenting a wobble, or a land, of an optical disc, said groove presenting the wobble indicating addresses, and in which the optical discs are of the same outer shape but differ in the recording capacity, said apparatus comprising:
rotational driving means for rotationally driving said optical disc;
optical means for converging the light for reading out data recorded in said wobble of said optical disc on said optical disc by a converging lens;
tracking error detecting means for detecting a tracking error signal for said groove, presenting the wobble, from the light focused on said optical disc by said optical means and reflected back from said groove presenting the wobble;
total light volume signal detection means for detecting a total light volume signal of a mark recorded on said groove, presenting the wobble, from the reflected light from said groove, presenting the wobble, on which the light has been focused by said optical means; and
discriminating means for discriminating the sorts of said optical discs based on phase comparison between a binary-coded version of said tracking error signal detected by said tracking error detection means and a binary-coded version of said total light volume signal as detected by said total light volume signal detection means.

2. The optical disc discriminating apparatus according to claim 1 wherein said discriminating means discriminates the sorts of the optical discs based on phase comparison between a binary coded version of said tracking error signal and a binary coded version of said total light volume signal, obtained by causing movement of said optical means at a constant velocity along the radius of the optical disc.

3. An optical disc discriminating method for discriminating plural sorts of optical discs in which data are recorded in a groove presenting a wobble or a land of an optical disc, said groove presenting the wobble indicating addresses, and in which the optical discs are of the same outer shape but differ in the recording capacity, said optical disc discriminating method comprising:
a tracking error detecting step of focusing the light radiated to said optical disc rotationally driven by said rotational driving means, through a converging lens, on the data recorded on said groove of said optical disc, presenting the wobble, and detecting the tracking error signal of the light with respect to a mark recorded on said groove, presenting the wobble, on which the light has been focused;
a total light volume detecting step of detecting a total light volume detecting signal of the mark recorded on said groove, presenting the wobble, from the reflected light from said groove, presenting the wobble, on which said light has been focused; and
a discriminating step of discriminating the sorts of said optical discs based on phase comparison between a binary coded version of said tracking error signal detected by said tracking error detection step and a binary coded version of said total light volume signal as detected by said total light volume signal detection step.

4. An optical disc discriminating apparatus for discriminating plural sorts of optical discs in which data are recorded in a groove presenting a wobble or a land of an optical disc, said groove presenting the wobble indicating addresses, and in which the optical discs are of the same outer shape but differ in the recording capacity, said apparatus comprising:
rotational driving means for rotationally driving said optical disc;
optical means for converging radiated light by a focusing lens on said optical disc, rotationally driven by said rotational driving means, for focusing the so converged light on said optical disc;
total light volume signal detection means for detecting a total light volume signal of a mark recorded on said groove, presenting the wobble, from the reflected light from said groove, presenting the wobble, on which the light has been focused by said optical means;
comparator means for outputting the results of comparison which is based on an inherent slice level with respect to the total light volume signal as detected by said total light volume signal detection means; and discrimination means for discriminating the sorts of the optical discs in dependence on the results of comparison by said comparator means.

5. An optical disc discriminating method for discriminating plural sorts of optical discs in which data are recorded in a groove presenting a wobble or a land of an optical disc, said groove presenting the wobble indicating addresses, and in which the optical discs are of the same outer shape but differ in the recording capacity, said optical disc discriminating method comprising:

a total light volume detecting step of focusing the light radiated to said optical disc rotationally driven by said rotational driving means, through a converging lens, on the data recorded on said groove of said optical disc, presenting the wobble, and detecting a total light volume signal of a mark recorded on said groove, presenting the wobble, on which the light has been focused;

a comparing step of outputting the result of comparison which is based on a inherent slice level with respect to the total light volume signal as detected by said total light volume detecting step; and a discriminating step of discriminating the sorts of the optical disc in dependence on the results of comparison by said comparing step.

6. An optical disc discriminating apparatus for discriminating plural sorts of optical discs in which data are recorded in a groove presenting a wobble, said groove presenting the wobble indicating addresses, and in which the optical discs are of the same outer shape but differ in the recording capacity, said apparatus comprising:

rotational driving means for rotationally driving said optical disc;

optical block movement means for causing movement of an optical block having a converging lens to a predetermined area on said optical disc after focusing pull-in of light through said converging lens to said optical disc, rotationally driven by said rotational driving means;

peak holding means for holding a peak level of a high frequency signal detected from said optical block moved by said optical block movement means to said predetermined area of said optical disc;

bottom holding means for holding a bottom level of a high frequency signal detected from said optical block moved by said optical block movement means to said predetermined area of said optical disc;

difference detection means for detecting the difference between the peak level as held by said peak holding means and the bottom level as held by said bottom holding means; and discriminating means for discriminating the sorts of the optical discs by comparing the magnitude of said difference as detected by said difference detection means to a threshold value.

7. An optical disc discriminating method for discriminating plural sorts of optical discs in which data are recorded in a groove presenting a wobble, said groove presenting the wobble indicating addresses, and in which the optical discs are of the same outer shape but differ in the recording capacity, said method comprising:

an optical block movement step of causing movement of an optical block having a converging lens to a predetermined area on said optical disc, rotationally driven by rotational driving means, after focusing pull-in of light through said converging lens to said optical disc;

a peak holding step of holding a peak level of a high frequency signal detected from said optical block moved by said optical block movement step to said predetermined area of said optical disc;

a bottom holding step of holding a bottom level of a high frequency signal detected from said optical block moved by said optical block movement means to said predetermined area of said optical disc;

a difference detection step of detecting the difference between the peak level as held by said peak holding step and the bottom level as held by said bottom holding step; and a discriminating step of discriminating the sorts of the optical discs by comparing the magnitude of said difference as detected by said difference detection step to a threshold value.

8. An optical disc recording apparatus for recording the information on optical discs of plural sorts in which data are recorded in a groove presenting a wobble or a land, said groove presenting the wobble indicating addresses, and in which the optical discs are of the same outer shape but differ in the recording capacity, said apparatus comprising:

rotational driving means for rotationally driving said optical disc;

optical means for converging the light for reading out data recorded in said wobble of said optical disc on said optical disc by a converging lens;

tracking error detecting means for detecting a tracking error signal for said groove, presenting the wobble, from the light focused on said optical disc by said optical means and reflected back from said groove presenting the wobble;

total light volume signal detection means for detecting a total light volume signal of a mark recorded on said groove, presenting the wobble, from the reflected light from said groove, presenting the wobble, on which the light has been focused by said optical means; and discriminating means for discriminating the sorts of said optical discs based on phase comparison between a binary coded version of said tracking error signal detected by said tracking error detection means and a binary coded version of said total light volume signal as detected by said total light volume signal detection means; wherein proper signal processing is selected based on the results of discrimination of the sorts of the optical discs by said discriminating means to record the information on the optical disc.

9. An optical disc discriminating apparatus for discriminating plural sorts of optical discs in which data are recorded in a groove presenting a wobble or a land of an optical disc, said groove presenting the wobble indicating addresses, and in which the optical discs are of the same outer shape but differ in the recording capacity, said apparatus comprising:

rotational driving means for rotationally driving said optical disc;

optical means for converging and focusing the radiated light by a converging lens on said disc rotationally driven by said rotational driving means;

total light volume signal detection means for detecting a total light volume signal of a mark recorded on said groove presenting the wobble, from the light focused by said optical means on said groove presenting the wobble and reflected back from said groove presenting the wobble;

comparing means for outputting the results of comparison which is based on an inherent slice level with respect to the total light volume signal as detected by said total light volume signal detection means; and discriminating means for discriminating the sorts of said optical discs based on the results of comparison by said comparison means; wherein proper signal processing is selected based on the results of discrimination of the sorts of the optical disc by said discriminating means to record the information on the optical disc.

10. An optical disc recording apparatus for recording the information on one of plural sorts of optical discs in which data are recorded in a groove presenting a wobble, or a land, said groove presenting the wobble indicating addresses, and in which the optical discs are of the same outer shape but differ in the recording capacity, said apparatus comprising:

rotational driving means for rotationally driving said optical disc;

an optical block movement means for causing movement of an optical block having a converging lens to a predetermined area on said optical disc after focusing pull-in of light through said converging lens to said optical disc, rotationally driven by said rotational driving means;

peak holding means for holding a peak level of a high frequency signal detected from said optical block moved by said optical block movement means to said predetermined area of said optical disc;

bottom holding means for holding a bottom level of a high frequency signal detected from said optical block moved by said optical block movement means to said predetermined area of said optical disc;

difference detection means for detecting the difference between the peak level as held by said peak holding means and the bottom level as held by said bottom holding means; and discriminating means for discriminating the sorts of the optical discs by comparing the magnitude of said difference as detected by said difference detection means to said threshold value; wherein proper signal processing is selected based on the results of discrimination of the sorts of the optical disc by said discriminating means to record the information on the optical disc.

11. An optical disc reproducing apparatus for reproducing the information from one of plural sorts of optical discs in which data are recorded in a groove presenting a wobble or a land of the optical disc, said groove presenting the wobble indicating addresses, and in which the optical discs are of the same outer shape but differ in the recording capacity, said apparatus comprising:

rotational driving means for rotationally driving said optical disc;

optical means for converging the light for reading out data recorded in said wobble of said optical disc on said optical disc by a converging lens;

tracking error detecting means for detecting a tracking error signal for said groove, presenting the wobble, from the light focused on said optical disc by said optical means and reflected back from said groove presenting the wobble;

total light volume signal detection means for detecting a total light volume signal of a mark recorded on said groove, presenting the wobble, from the reflected light from said groove, presenting the wobble, on which the light has been focused by said optical means; and discriminating means for discriminating the sorts of said optical discs based on phase comparison between a binary coded version of said tracking error signal detected by said tracking error detection means and a binary coded version of said total light volume signal as detected by said total light volume signal detection means, wherein proper signal processing is selected based on the results of discrimination of the sorts of the optical disc by said discriminating means to reproduce the information from the optical disc.

12. An optical disc reproducing apparatus for reproducing the information from plural sorts of optical discs in which data are recorded in a groove presenting a wobble or a land of an optical disc, said groove presenting the wobble indicating addresses, and in which the optical discs are of the same outer shape but differ in the recording capacity, said apparatus comprising:

rotational driving means for rotationally driving said optical disc;

optical means for converging radiated light by a focusing lens on said optical disc, rotationally driven by said rotational driving means, for focusing the so converged light on said optical disc;

total light volume signal detection means for detecting a total light volume signal of a mark recorded on said groove, presenting the wobble, from the reflected light from said groove, presenting the wobble, on which the light has been focused by said optical means;

comparator means for outputting the results of comparison which is based on an inherent slice level with respect to the total light volume signal as detected by said total light volume signal detection means; and discrimination means for discriminating the sorts of the optical discs in dependence on the results of comparison by said comparator means; wherein proper signal processing is selected based on the results of discrimination of the sorts of the optical discs by said discriminating means to reproduce the information from the optical disc.

13. An optical disc reproducing apparatus in which data are recorded in a groove presenting a wobble or a land, said groove presenting the wobble indicating addresses, and in which the optical discs are of the same outer shape but differ in the recording capacity, said apparatus comprising:

rotational driving means for rotationally driving said optical disc;

an optical block movement means for causing movement of an optical block having a converging lens to a predetermined area on said optical disc after focusing pull-in of light through said converging lens to said optical disc, rotationally driven by said rotational driving means;

peak holding means for holding a peak level of a high frequency signal detected from said optical block moved by said optical block movement means to said predetermined area of said optical disc;

bottom holding means for holding a bottom level of a high frequency signal detected from said optical block moved by said optical block movement means to said predetermined area of said optical disc;

difference detection means for detecting the difference between the peak level as held by said peak holding means and the bottom level as held by said bottom holding means; and discriminating means for discriminating the sorts of the optical discs by comparing the magnitude of said difference as detected by said difference detection means to a threshold value; wherein proper signal processing is selected based on the results of discrimination of the sorts of the optical disc by said discriminating means to record the information on the optical disc.

* * * * *